US010298893B2

(12) United States Patent
Moule et al.

(10) Patent No.: US 10,298,893 B2
(45) Date of Patent: May 21, 2019

(54) SYSTEM AND METHOD FOR DIGITAL BLACK LEVEL BLENDING

(71) Applicant: CHRISTIE DIGITAL SYSTEMS USA, INC., Cypress, CA (US)

(72) Inventors: Kevin Moule, Kitchener (CA); Nick Wasilka, Kitchener (CA); Peter Anthony Van Eerd, Guelph (CA); Andrew Douglas Dennison, Breslau (CA); Ryan Thomas Morris, Kitchener (CA); Daniel Thomson Urquhart, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 22 days.

(21) Appl. No.: 15/633,839

(22) Filed: Jun. 27, 2017

(65) Prior Publication Data
US 2018/0139422 A1     May 17, 2018

Related U.S. Application Data

(63) Continuation-in-part of application No. 15/408,983, filed on Jan. 18, 2017.
(Continued)

(51) Int. Cl.
*H04N 5/64* (2006.01)
*H04N 9/31* (2006.01)
(Continued)

(52) U.S. Cl.
CPC .......... *H04N 9/3179* (2013.01); *G06T 5/002* (2013.01); *G06T 7/13* (2017.01); *H04N 9/3147* (2013.01);
(Continued)

(58) Field of Classification Search
CPC ........................ H04N 9/3194; H04N 9/3147
See application file for complete search history.

(56) References Cited

U.S. PATENT DOCUMENTS 6,637,887 B2 * 10/2003 Yamanaka ............. G03B 21/26
                                                                   348/744
7,038,727 B2      5/2006 Majumder et al.
(Continued)

OTHER PUBLICATIONS

Kevin Moule, et al., "System and Method for Digital Black Level Blending", U.S. Appl. No. 15/408,983, filed Jan. 18, 2017.
(Continued)

*Primary Examiner* — Jefferey F Harold
*Assistant Examiner* — Humam M Satti
(74) *Attorney, Agent, or Firm* — Perry + Currier, Inc.

(57) ABSTRACT

A system and method for digital black level blending is provided. The system comprises: projectors located to project respective projector images overlapping in overlap regions; at least one sensor configured to acquire digital images of at least portions of the plurality of projector images; and a computing device configured to, for each given projector: determine, using the at least one sensor, respective correspondences between projected points of a given projector image and respective points of respective image modulators of other projectors of the projectors, the correspondences representing the respective points of the respective image modulators of the other projectors that correspond to overlap regions; determine respective brightness of the overlap regions; and, control pixels of an image modulator of the projector, and each of the respective image modulators, at least adjacent edge pixels corresponding to overlap region edges, to increase brightness in corresponding projector image regions using the respective brightness.

15 Claims, 19 Drawing Sheets

Related U.S. Application Data

(60) Provisional application No. 62/420,830, filed on Nov. 11, 2016.

(51) Int. Cl.
    *G06T 5/00*     (2006.01)
    *G06T 7/13*     (2017.01)

(52) U.S. Cl.
    CPC ......... *H04N 9/3182* (2013.01); *H04N 9/3194* (2013.01)

(56) References Cited

U.S. PATENT DOCUMENTS

| | | | |
|---|---|---|---|
| 7,724,206 B2* | 5/2010 | Saito | H04N 9/3194 345/1.3 |
| 8,406,562 B2* | 3/2013 | Bassi | H04N 9/3147 382/275 |
| 8,730,130 B1 | 5/2014 | Pray et al. | |
| 8,994,757 B2 | 3/2015 | Surati et al. | |
| 9,578,295 B1* | 2/2017 | Morrison | H04N 9/3185 |
| 9,860,494 B2* | 1/2018 | Johnson | G03B 21/13 |
| 2002/0057361 A1* | 5/2002 | Mayer, III | H04N 9/12 348/383 |
| 2005/0140568 A1* | 6/2005 | Inazumi | H04N 9/3147 345/1.3 |
| 2007/0291184 A1 | 12/2007 | Harville et al. | |
| 2011/0019108 A1* | 1/2011 | Nelson | H04N 9/31 348/745 |
| 2011/0234920 A1* | 9/2011 | Nelson | H04N 9/3147 348/745 |
| 2012/0120372 A1* | 5/2012 | Timoner | G06T 5/006 353/31 |
| 2013/0215138 A1* | 8/2013 | Suzuki | G06T 11/001 345/593 |
| 2014/0354674 A1* | 12/2014 | Okamoto | G09G 5/02 345/590 |
| 2016/0261838 A1* | 9/2016 | Ranieri | H04N 9/312 |
| 2017/0070711 A1* | 3/2017 | Grundhofer | H04N 9/3147 |

OTHER PUBLICATIONS

Non-Final Rejection (OA) dated Sep. 5, 2017, by USPTO, re U.S. Appl. No. 15/408,983.

DLP4501 (0.45 WXGA S311 DMD) Data Sheet. (2015). [PDF] Texas Instruments Incorporated. Available at:http://www.ti.com/lit/ds/symlink/dlp4501.pdf [retrieved on Mar. 27, 2018].

EPO, Partial European Search Report, dated Apr. 9, 2018, re European Patent Application No. 17198480.0.

Gianino, P.D., et al. "Effects of spatial light modulator opaque dead zones on optical correlation." Applied optics 31.20 (1992):4025-4033.

Final Rejection, dated Feb. 7, 2018, by USPTO, re U.S. Appl. No. 15/408,983.

EPO, Extended European Search Report, dated Jul. 16, 2018, re European Patent Application No. 17198480.0.

\* cited by examiner

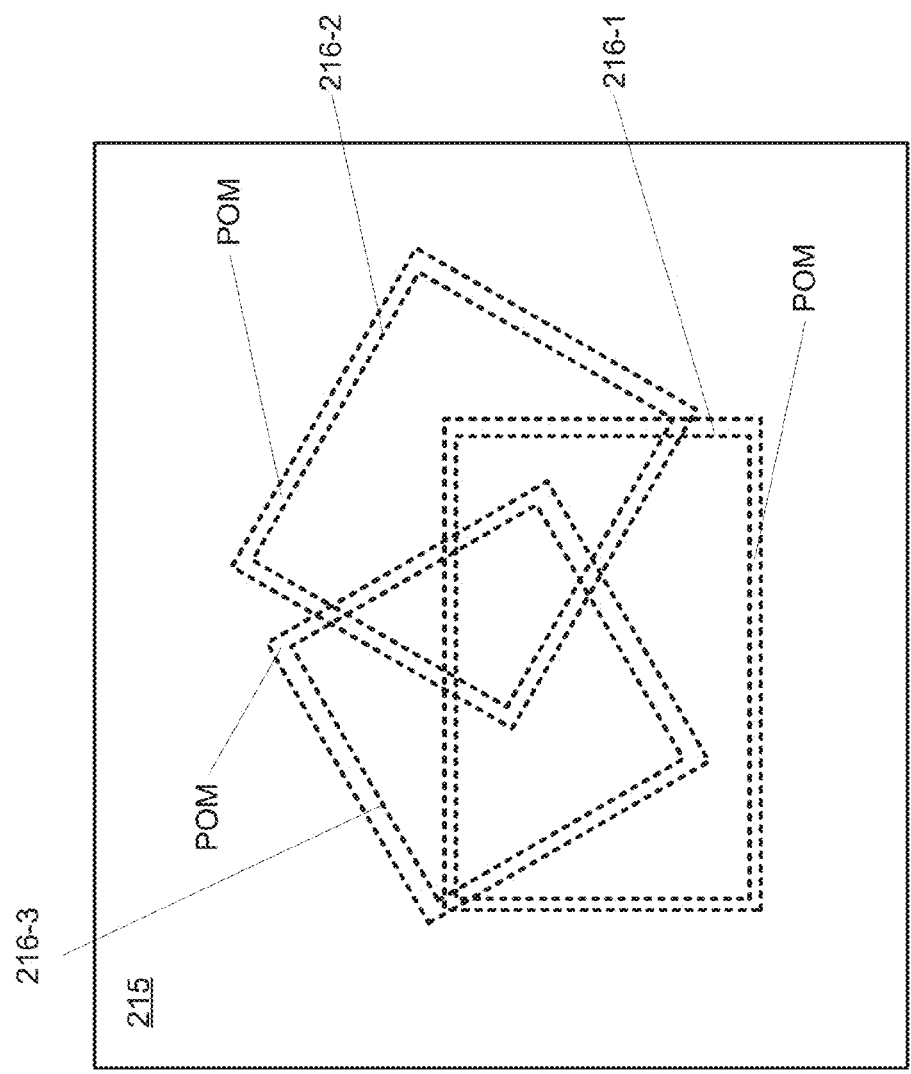
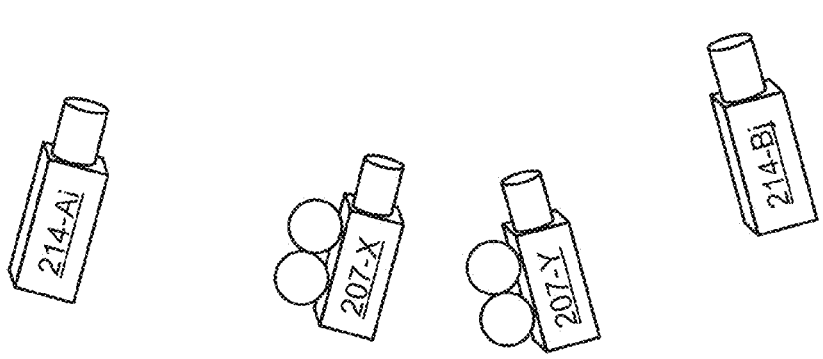
Fig. 5

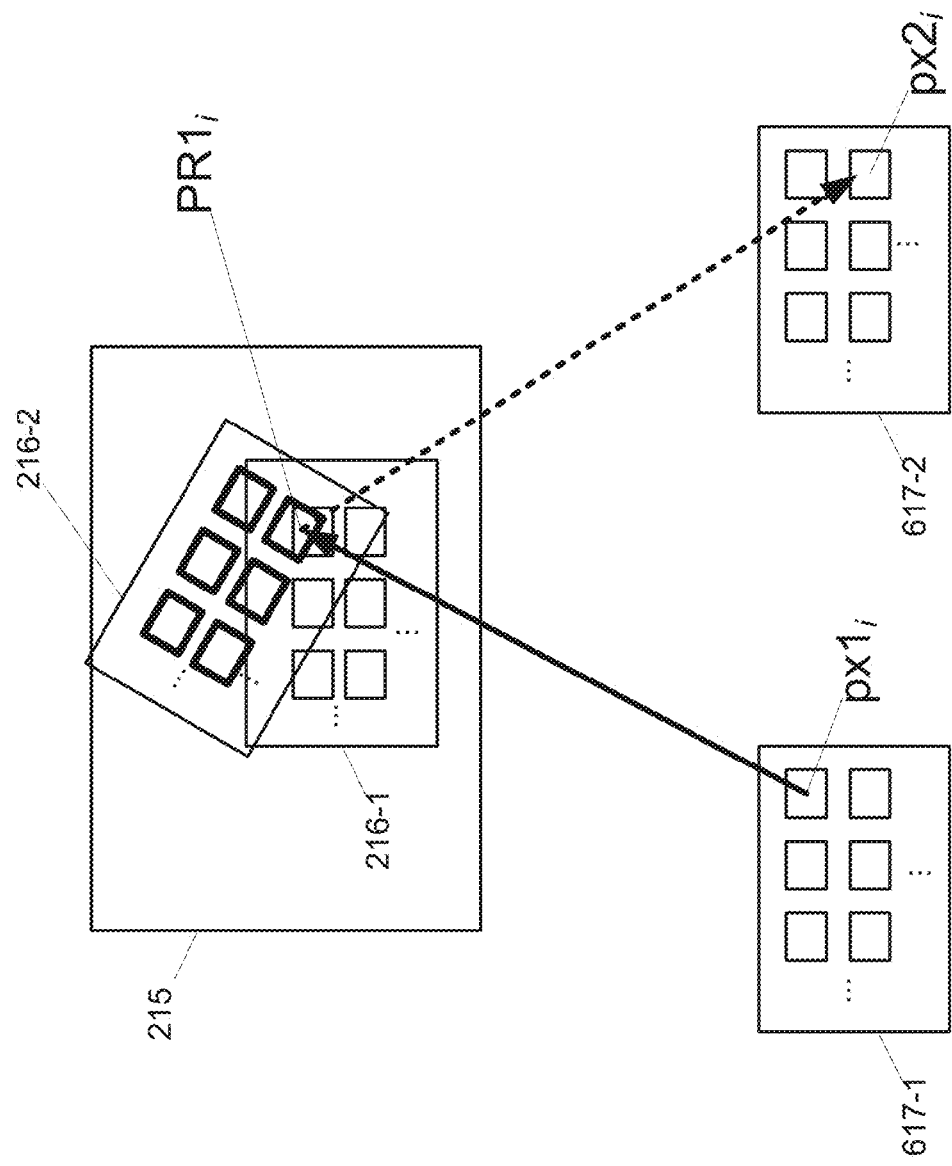

```
┌─────────────────────────────────────────────────────────────────┐
│ Determine, Using The At Least Sensor, Respective Correspondences │
│ Between Projected Points Of A Given Projector Image, And Respective│
│   Points Of Respective Image Modulators Of Other Projectors Of The│
│  Plurality Of Projectors, The Respective Correspondences Representing│
│  The Respective Points Of The Respective Image Modulators Of The Other│
│    Projectors That Correspond To The One Or More Overlap Regions │
│                              1801                                │
└─────────────────────────────────────────────────────────────────┘
                                 │
                                 ▼
┌─────────────────────────────────────────────────────────────────┐
│  Determines A Subset Of The Respective Correspondences Using One or│
│       More Of Interpolation Techniques And Extrapolation Techniques│
│                              1802                                │
└─────────────────────────────────────────────────────────────────┘
                                 │
                                 ▼
┌─────────────────────────────────────────────────────────────────┐
│        Determine Respective Brightness Of The One Or More Overlap Regions│
│                              1803                                │
└─────────────────────────────────────────────────────────────────┘
                                 │
                                 ▼
┌─────────────────────────────────────────────────────────────────┐
│Control Pixels Of The Given Image Modulator And Each Of The Respective│
│Image Modulators, At Least Adjacent Edge Pixels Corresponding To Edges│
│   Of The One Or More Overlap Regions, To Increase Brightness In │
│     Corresponding Projector Image Regions Based On The Respective│
│                           Brightness                             │
│                              1805                                │
└─────────────────────────────────────────────────────────────────┘
```

SYSTEM AND METHOD FOR DIGITAL BLACK LEVEL BLENDING

CROSS-REFERENCE TO RELATED APPLICATION(S)

This application claims priority from U.S. Patent Application No. 62/420,830, filed Nov. 11, 2016, and U.S. patent application Ser. No. 15/408,983, filed Jan. 18, 2017, each of which is incorporated herein by reference.

FIELD

The specification relates generally to projectors, and specifically to a system and method for digital black level blending.

BACKGROUND

Projectors, even when projecting "black" still project some (e.g. grey, dark grey, whiteish, etc.) light onto the screen. When multiple projectors overlap onto a screen, the overlap regions become an even brighter "black" than the adjacent regions. The overlap regions hence distract from the projected content; for example, when content being projected is a mostly black scene (e.g. fireworks in a night sky), in the overlap regions, polygonal regions appear that are brighter than the surrounding darker area(s).

One solution is to move fixed geometry neutral density filter assemblies in and out of a light path frustum from a lens of a projector, to attempt to create a non-distracting optical blend for dark scenes, which can work for night simulators and other situations with dark scenes. However, such a solution does not tend to work well with projectors much higher than 8000 lumens without overheating and distorting the filters, unless they are quite large and far away from the lens, which can be awkward to arrange. While such filters can also be made with heat-tolerant materials, these materials can be harder to work with, can be expensive and/or can have inferior optical properties.

SUMMARY

Provided herein is a system and method for digital black level blending for a plurality of projectors with overlapping projection regions, the digital black level blending occurring around the overlapping projection regions. In particular, the projectors can be controlled such that the overlap regions are less noticeable, even when only black images are being projected. Since the overlap regions cannot be made dimmer (without physical/optical attachments), overlaps are lessened by adding, in various ways, some light to the non-overlap regions. Indeed, by using an electrical/digital solution (instead of an optical/physical solution), techniques described herein can be used adapt to changes in the overlap regions that occur due to changes in the projector/screen configuration and/or alignment. In particular, the present specification includes a system that determines correspondences of image points projected onto a screen/object by a given projector with points at image modulators at other projectors, some of the correspondences hence associated with one or more overlap regions. Once the points at the image modulators that correspond to the one or more overlap regions are determined, the pixels of the image modulators on or around the points within the overlaps and around the overlaps can be controlled to determine brightness differences between the one or more overlap regions and the other areas of the images, and to thereafter reduce the brightness differences between the one or more overlap regions and the other areas of the images.

Furthermore, in this specification, various example terminologies will be used to describe projection. For example, projectors project pixels of image modulators as pixel-regions onto objects and/or screens; such pixel-regions are in a field-of-view of pixels of image modulators in one or more sensors (including but not limited to camera sensors/images and/or light sensors at an object and/or a screen) that can be used to form correspondences between "points" in the projectors (e.g. at image modulators thereof) to "points" on the objects and/or screens and/or to points in the one or more sensors (e.g. at camera sensors/imagers, light sensors at an object and/or a screen, etc.), etc. With these correspondences, correspondences between any pairs of points and/or pixels of two more projectors can be determined, the correspondences being one or more of points correspondences between projectors, pixel correspondences between projectors and/or region correspondences between projectors. Furthermore, herein, the term "pixel" is used to indicate a smallest unit of image data that is formed by an image modulator of a projector (and/or a smallest unit of image data of original image content), the term "region" and/or "pixel-region" will be used to indicate a region and/or pixel of a projected image at an object and/or screen, the term "overlap region" will be used to indicate regions of projected images that overlap, and the term "point" will be used with respect to underlying correspondences between pixels and/or subpixels and/or regions. Indeed, herein correspondences are specifically described as being determined between points, though such correspondences can also be determined between points and/or regions and/or pixels and/or subpixels.

Hence, in this specification, the phrase "determining correspondences between points" can include, but is not limited to, "determining correspondences between regions", "determining correspondences between pixels", "determining correspondences between subpixels", and/or determining correspondences between any variation thereof, including determining correspondences between points and regions, points and pixels, regions and pixels, etc.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a system comprising: a plurality of projectors, each comprising an image modulator, the plurality of projectors located to project respective projector images, formed by respective image modulators, a plurality of projector images overlapping in one or more overlap regions; at least one sensor configured to acquire digital images of at least portions of the plurality of projector images; and a computing device configured to, for each given projector comprising a given image modulator, of the plurality of projectors: determine, using the at least one sensor, respective correspondences between projected points of a given projector image and respective points of respective image modulators of other projectors of the plurality of projectors, the respective correspondences representing the respective points of the respective image modulators of the other projectors that correspond to the one or more overlap regions; determine respective brightness of the one or more overlap regions; and, control pixels of the given image modulator and each of the respective image modulators, at least adjacent edge pixels corresponding to edges of the one or more overlap regions, to increase brightness in corresponding projector image regions based on the respective brightness.

In some implementations, the respective correspondences between the projected points and the respective points occur for at least the edge pixels corresponding to the edges of the one or more overlap regions.

In some implementations, the respective correspondences include correspondences associated with respective dead zone pixels around a perimeter of each of the given image modulator and the respective image modulators.

In some implementations, the computing device is further configured to control at least a portion of the pixels of the given image modulator and each of the respective image modulators, outside of one or more of the one or more overlap regions, and at least adjacent the edge pixels corresponding to the edges of the one or more overlap regions, to increase the brightness in the corresponding projector image regions to match the respective brightness of the one or more overlap regions.

In some implementations, the computing device is further configured to control the pixels of the given image modulator and each of the respective image modulators, at least adjacent the edge pixels corresponding to the edges of the one or more overlap regions, to increase the brightness in the corresponding projector image regions according to respective distances from the edge pixels.

In some implementations, the computing device is further configured to control the pixels of the given image modulator and each of the respective image modulators, at least adjacent the edge pixels corresponding to the edges of the one or more overlap regions, according to one or more of: a closest corresponding overlap region edge of projected projector images; a weighting based on one or more closest corresponding overlap region edges of the projected projector images; and a cumulative brightness from each of the one or more closest corresponding overlap region edges of the projected projector images.

In some implementations, the computing device is further configured to: determine respective orientations of image pixels of the given projector image and other projector images that form the one or more overlap regions; and further control the pixels of the given image modulator and each of the respective image modulators according to the respective orientations of the image pixels.

In some implementations, the computing device is further configured to: determine respective projected sizes of image pixels of the given projector image and other projector images that form the one or more overlap regions; and further control the brightness of the pixels of the given image modulator and each of the respective image modulators according to the respective projected sizes of the image pixels.

In some implementations, the computing device is further configured to: determine respective projected colors of image pixels of the given projector image and other projector images that form the one or more overlap regions; and further control the pixels of the given image modulator and each of the respective image modulators according to the respective projected colors of the image pixels.

Another aspect of the specification provides a method comprising: at a system including a: computing device; a plurality of projectors, each comprising an image modulator, the plurality of projectors located to project respective projector images, formed by respective image modulators, a plurality of projector images overlapping in one or more overlap regions; and at least one sensor configured to acquire digital images of at least portions of the plurality of projector images, for each given projector comprising a given image modulator, of the plurality of projectors: determining, using the at least sensor, respective correspondences between projected points of a given projector image, and respective points of respective image modulators of other projectors of the plurality of projectors, the respective correspondences representing the respective points of the respective image modulators of the other projectors that correspond to the one or more overlap regions; determining respective brightness of the one or more overlap regions; and, controlling pixels of the given image modulator and each of the respective image modulators, at least adjacent edge pixels corresponding to edges of the one or more overlap regions, to increase brightness in corresponding projector image regions based on the respective brightness.

In some implementations, the respective correspondences between the projected points and the respective points occur for at least the edge pixels corresponding to the edges of the one or more overlap regions.

In some implementations, the respective correspondences include correspondences associated with respective dead zone pixels around a perimeter of each of the given image modulator and the respective image modulators.

In some implementations, the method further comprises controlling at least a portion of the pixels of the given image modulator and each of the respective image modulators, outside of the one or more overlap regions, and at least adjacent the edge pixels corresponding to the edges of the one or more overlap regions, to increase the brightness in the corresponding projector image regions to match the respective brightness of the one or more overlap regions.

In some implementations, the method further comprises controlling the pixels of the given image modulator and each of the respective image modulators, at least adjacent the edge pixels corresponding to the edges of the one or more overlap regions, to increase the brightness in the corresponding projector image regions according to respective distances from the edge pixels.

In some implementations, the method further comprises controlling the pixels of the given image modulator and each of the respective image modulators, at least adjacent the edge pixels corresponding to the edges of the one or more overlap regions, according to one or more of: a closest corresponding overlap region edge of projected projector images; a weighting based on one or more closest corresponding overlap region edges of the projected projector images; and a cumulative brightness from each of the one or more closest corresponding overlap region edges of the projected projector images.

In some implementations, the method further comprises determining respective orientations of image pixels of the given projector image and other projector images that form the one or more overlap regions; and further control the pixels of the given image modulator and each of the respective image modulators according to the respective orientations of the image pixels.

In some implementations, the method further comprises determining respective projected sizes of image pixels of the given projector image and other projector images that form the one or more overlap regions; and further control the brightness of the pixels of the given image modulator and each of the respective image modulators according to the respective projected sizes of the image pixels.

In some implementations, the method further comprises determining respective projected colors of image pixels of the given projector image and other projector images that form the one or more overlap regions; and further control the pixels of the given image modulator and each of the respective image modulators according to the respective projected colors of the image pixels.

Yet a further aspect of the specification provides a computer-readable medium storing a computer program, wherein execution of the computer program is for: at a computing device in communication with a plurality of projectors, each comprising an image modulator, the plurality of projectors located to project respective projector images, formed by respective image modulators, a plurality of projector images overlapping in one or more overlap regions; and at least one sensor configured to acquire digital images of at least portions of the plurality of projector images, for each given projector comprising a given image modulator, of the plurality of projectors: determining, using the at least one sensor, respective correspondences between projected points of a given projector image, and respective points of respective image modulators of other projectors of the plurality of projectors, the respective correspondences representing the respective points of the respective image modulators of the other projectors that correspond to the one or more overlap regions; determining respective brightness of the one or more overlap regions; and, controlling pixels of the given image modulator and each of the respective image modulators, at least adjacent edge pixels corresponding to edges of the one or more overlap regions, to increase brightness in corresponding projector image regions based on the respective brightness. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 5 depicts outlines of images projected onto a screen of FIG. 2, including pond-of-mirror outlines, according to non-limiting implementations.

FIG. 6B depicts the backshooting technique of FIG. 6A using two image modulators, according to non-limiting implementations.

FIG. 18 depicts a method for digital black level blending, according to non-limiting implementations.

DETAILED DESCRIPTION

Figure 1:
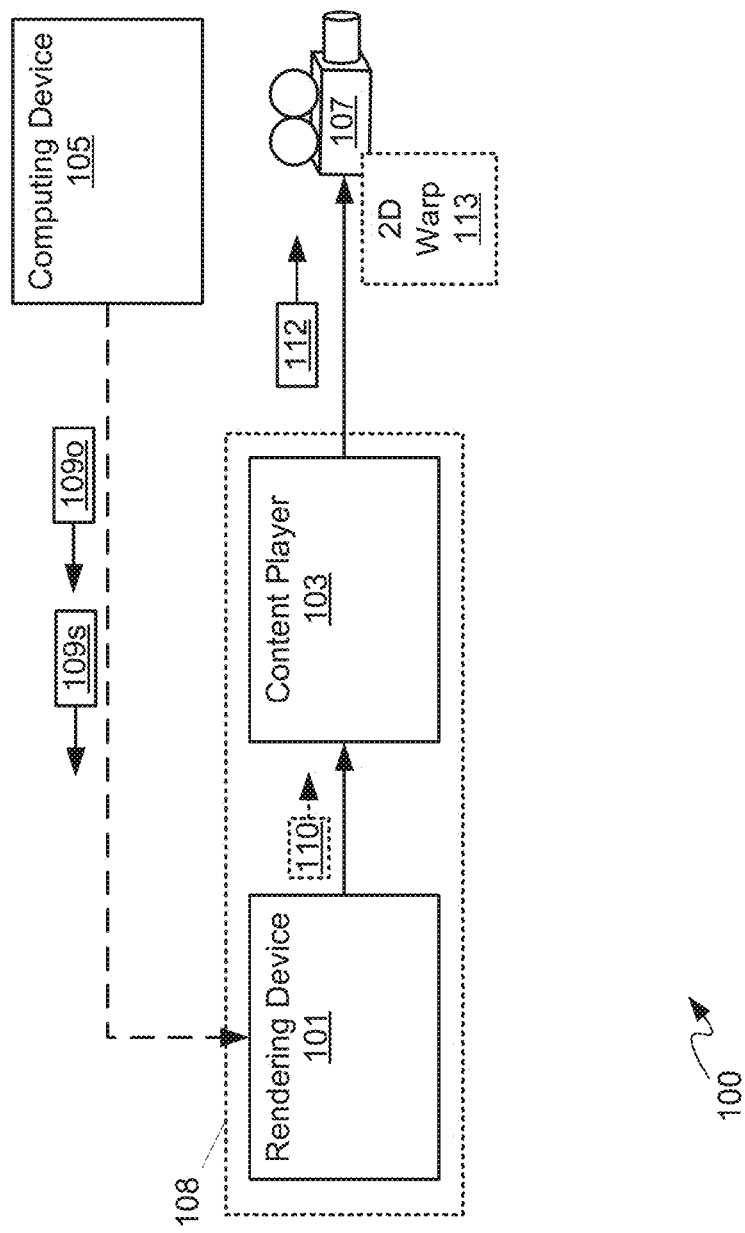
FIG. 1 depicts a projection system, according to non-limiting implementations.

FIG. 1 depicts a system 100 comprising: a rendering device 101 (interchangeably referred to hereafter as device 101); a content player 103; a computing device 105; and a projector 107. In general, device 101 is in communication with content player 103 and optionally computing device 105, and content player 103 is in communication with projector 107.

As depicted, device 101 and content player 103 are combined into one device 108, however in other implementations device 101 and content player 103 can be separate devices. Computing device 105 is configured to generate geometric data 109s comprising at least data defining geometric relationships between, for example, projector 107 and objects onto which projector 107 projects, such as screen. Device 101 can generate rendered image data 110 from geometric data 109s, for example by rendering existing image data (not depicted) for projection by projector 107. In FIG. 1, solid lines connecting components show flow of image and/or video data there between, while the stippled line connecting computing device 105 to device 101 and/or device 108 shows flow of geometric data 109s and object data 109o there between. Object data 109o generally comprises a model of a location and orientation of an object onto which images from projector 107 are projected, and can be provided with the object and/or determined by computing device 105 using one or more cameras.

When device 101 and content player 103 are separate, device 101 communicates image data 110 to content player 103, which processes and/or "plays" image data 110 by producing projection data 112 suitable for processing and projection by projector 107. For example, image data 110 can include, but is not limited to, an AVI file, a series of JPG files, a PNG file, and the like. Projection data 112 can include, but is not limited to, HDMI data, VGA data, and/or video transport data. When device 101 and content player 103 are combined in device 108, device 108 can render projection data 112 (e.g. video data) in real-time without producing image data 110. In any event, projection data 112 is communicated to projector 107 by content player 103 where projection data 112 is used to control projector 107 to project images based thereupon, for example onto a three-dimensional object.

Device 101 generally comprises an image generator and/or renderer, for example a computing device, a server and the like, configured to generate and/or render images as image data 110. Such image data 110 can include, but is not limited to, still images, video and the like. Furthermore, though not depicted, device 101 can be in communication with, and/or comprise, an image generator and/or a memory storing data from which image data 110 can be generated and/or rendered. Alternatively, device 101 can generate image data 110 using algorithms, and the like, for generating images.

Content player 103 comprises a player configured to "play" and/or render image data 110; for example, when image data 110 comprises video data, content player 103 is configured to play and/or render the video data by outputting projection data 112 for projection by projector 107. Hence, content player 103 can include, but is not limited to a video player, a video processing device, a computing device, a server, and the like. However, as described above, when device 101 and content player 103 are combined as device 108, rendering of image data 110 can be eliminated and device 108 renders projection data 112 without producing image data 110.

Computing device 105 comprises any suitable combination of projectors (including projector 107), cameras (not depicted in FIG. 1), and computing devices configured to one or more of: automatically determine geometric data 109s of projector 107; and optionally automatically determine object data 109o. Non-limiting implementations of computing device 105 will be described below with reference to FIGS. 2 to 16.

Projector 107 comprises a projector configured to project projection data 112, including but not limited to a digital projector, a cinema projector, an LCOS (Liquid Crystal on Silicon) based projector, a DMD (digital multimirror device) based projector and the like. Furthermore, while only one projector 107 is depicted, system 100 can comprise a plurality of projectors 107, each configured to project respective projection data comprising, for example, portions of larger tiled image to be projected. Regardless of a technology used in projector 107, it is assumed that projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 further comprises one or more 2D ("two-dimensional") warping devices and/or modules 113, for example at projector 107 (though such a warping device can be present at content player and/or as a stand-alone device) When present, projection data 112 can be warped by warping device 113, for example by moving and/or adjusting pixels within projection data 112, to adjust projection data 112 for projection by projector 107 onto an object including, but not limited to, a screen, an object and the like. However, as computing device 105 determines geometric data 109s and communicates such to device 101 (and/or device 108), warping module 113 can be unused, optional and/or eliminated from system 100. Indeed, use of warping module 113 represents how images were processed according to the prior art and the presence of warping module 113 is obviated by virtue of computing device 105 providing device 101 (and/or device 108) with geometric data 109s. However, in some implementations, warping module 113 can be used to make small changes to projection of images onto a physical object, for example when a virtual model of the object used to produce the images does not precisely match the physical object.

While each of device 101, content player 103, computing device 105, and projector 107 are depicted as distinct components, in other implementations, respective portions of one or more of device 101, content player 103, computing device 105, and projector 107 and can be implemented within the same device (e.g. device 108) and/or processing resources can be shared there between. For example, while not depicted, system 100 comprises one or more controllers, one or more processors, one or more memories and one or more communication interfaces, for example a controller, memory and communication interface for each of device 101, content player 103, computing device 105, and projector 107 and/or to be shared among device 101, content player 103, computing device 105, and projector 107. Indeed, in general, components of system 100, as depicted, represent different functionality of a projection system where: geometric data 109s of projector 107 can be automatically determined. In some implementations, system 100 includes components and/or functionality for projection mapping onto three-dimensional objects and/or for updating geometric data 109s when projector 107 moves, and/or a screen and/or object, onto which images are being projected, moves.

Figure 2:
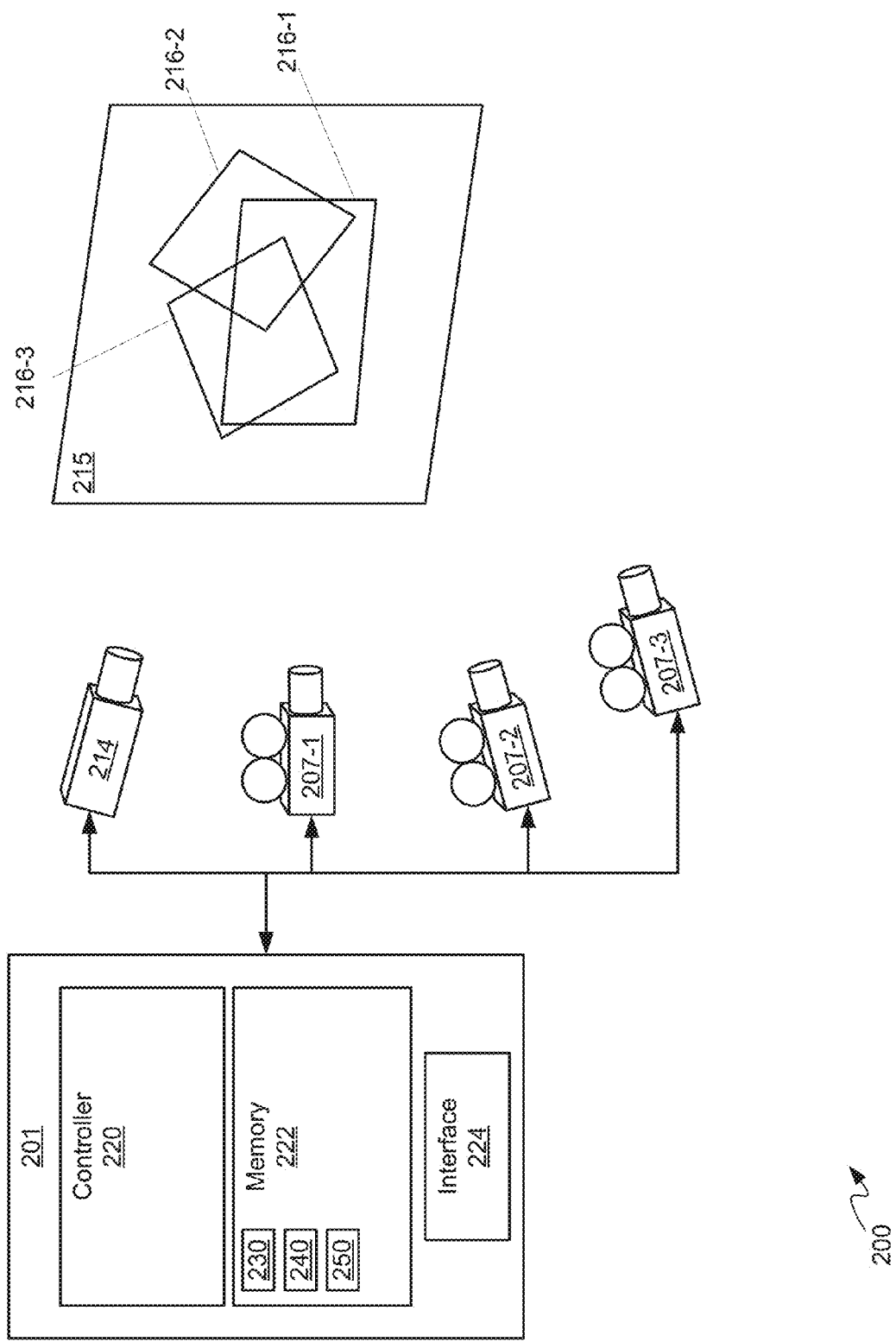
FIG. 2 depicts a system for digital black level blending which can be used in the system of FIG. 1, according to non-limiting implementations.
Figure 3:
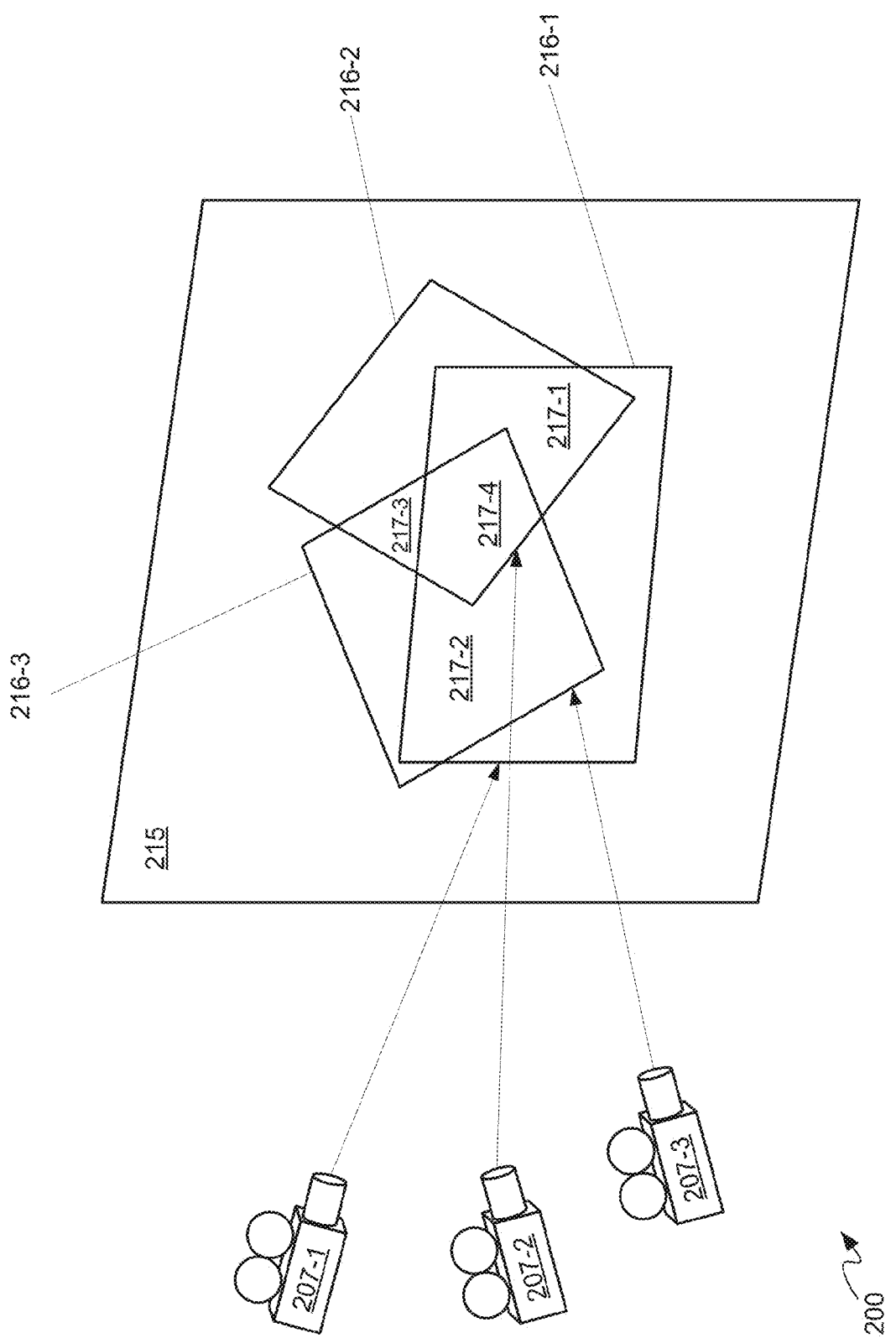
FIG. 3 depicts details of projectors of the system of FIG. 2 projecting images onto a screen, according to non-limiting implementations.

Attention is next directed to FIG. 2 which depicts a system 200 for digital black level blending. Indeed, computing device 105 can include one or more components of system 200, and furthermore components of system 100 can comprise components of system 200 as desired. System 200 comprises a computing device 201 (interchangeably referred to hereafter as device 201), a plurality of projectors 207-1, 207-2, 207-3 (interchangeably referred to, collectively, as projectors 207 and, generically, as a projector 207); at least one camera 214; and an object, including, but not limited to, a screen 215, onto which images from projectors 207 are to be projected. Indeed, it is assumed that each projector 207 is mounted relative to screen 215 such that images from projectors 207 are projected onto screen 215. Further, it is assumed that camera 214 can be used to determine a geometry of projectors 207 relative to screen 215 and/or a geometry of screen 215; in particular, at least one camera 214 is arranged to capture digital pictures of screen 215 and specifically of images projected onto screen 215 by projectors 207. While device 201 is shown as being in communication with projectors 207 and camera 214, system 200 can include other computing devices and/or communication devices communicatively located between device 201 and projectors 207/camera 214, for example a device which generates and/or manipulates a video signal into projectors 207 (e.g. as in system 100 where computing device 105 is in communication with rendering device 101 and/or content player 103 which is in turn in communication with projector 107).

However, while present implementations are described with respect to screen 215, in other implementations, screen can be replaced with an object, including a three-dimensional object, and projector 207 can projection map onto the object.

Each of projectors 207 comprises an image modulator (not depicted in FIG. 2) and further projectors 207 are located to project respective images 216-1, 216-2, 216-3 (interchangeably referred to, collectively, as images 216 and, generically, as an image 216) onto screen 215, formed by respective image modulators of projectors 207, respective images 216 overlapping on screen 215 in one or more overlap regions. For example, with reference to FIG. 3, which depicts projectors 207, screen 215 and images 216, projector 207-1 projects image 216-1, projector 207-2 projects image 216-2, and projector 207-3 projects image 216-3. Furthermore, images 216-1, 216-2 overlap in an overlap region 217-1, images 216-1, 216-3 overlap in an overlap region 217-2, images 216-2, 216-3 overlap in an overlap region 217-3, and images 216-1, 216-2, 216-3 overlap in an overlap region 217-4. Overlap regions are interchangeably referred to, collectively, as overlap regions 217 and, generically, as an overlap region 217.

Returning to FIG. 2, in general, projector 107 can comprise any one or more of projectors 207, computing device 105 can comprise computing device 201, projectors 207 and at least one camera 214, and any of device 101 and content player 103 can comprise at least a portion of computing device 201, for example when resources are shared amongst device 101, content player 103 and computing device 105.

Furthermore, while three projectors 207 are depicted, system 200 can comprise at least two projectors 207 that project overlapping images 216, or more than three projectors 207 where two or more of projected images 216 overlap. Indeed, while as depicted all three images 216 overlap (resulting in four overlap regions 217), in other implementations, only adjacent images 216 overlap and/or only a portion of images 216 overlap.

Device 201 can comprise any suitable computing device, including but not limited to a graphics processing unit (GPU), a graphics processing device, a graphics processing engine, a video processing device, a personal computer (PC), a server, and the like, and generally comprises a controller 220, a memory 222 and a communication interface 224 (interchangeably referred to hereafter as interface 224) and optionally any suitable combination of input devices and display devices.

Interface 224 comprises any suitable wired or wireless communication interface configured to communicate with projector 207 and camera 214 (and any of device 101, content player 103, computing device 105, and device 108) in a wired and/or wireless manner as desired.

Controller 220 can comprise a processor and/or a plurality of processors, including but not limited to one or more central processors (CPUs) and/or one or more processing units; either way, controller 220 comprises a hardware element and/or a hardware processor. Indeed, in some implementations, controller 220 can comprise an ASIC (application-specific integrated circuit) and/or an FPGA (field-programmable gate array) specifically configured to determine at least pose data of a projector, for example projector 207. Hence, device 201 is preferably not a generic computing device, but a device specifically configured to implement specific digital black level blend functionality. For example, device 201 and/or controller 220 can specifically comprise a computer executable engine configured to implement specific digital black level blend functionality.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 201 as described herein are typically maintained, persistently, in memory 222 and used by controller 220 which makes appropriate utilization of volatile storage during the execution of such programming instructions. Those skilled in the art recognize that memory 222 is an example of computer readable media that can store programming instructions executable on controller 220. Furthermore, memory 222 is also an example of a memory unit and/or memory module and/or a non-volatile memory.

In particular, memory 222 stores an application 230 that, when processed by controller 220, enables controller 220 and/or computing device 201 to: determine, using the at least one camera 214, respective correspondences between projected points of a given image 216, projected onto an object (e.g. screen 215) by the given projector 207 at the object, and respective points of respective image modulators of other projectors 207 of the plurality of projectors 207, the respective correspondences representing the respective pixels of the image modulators of the other projectors 207 that correspond to the one or more overlap regions 217; determine respective brightness of the one or more overlap regions 217; and, control pixels of the given image modulator and each of the respective image modulators, at least adjacent edge pixels corresponding to edges of the one or more overlap regions 217, to increase brightness in corresponding image regions based on the respective brightness.

In other implementations, as depicted, memory 222 further stores a model 240 of screen 215 and/or any other object onto which images are projected, which can be determined using camera 214 and projectors 207, for example, by controlling projectors 207, and the like, to project images, such as boxes, structured light patterns, and the like, onto screen 215 and determine a geometry thereof from pictures acquired by camera 214; however, in other implementations, model 240 can be provisioned at memory 222 using, for example, a given digital model supplied with screen 215. In general, object data 1090 can comprise model 240, and can be optionally provided to components of system 100 as described above.

Furthermore, as depicted, memory 222 further stores geometric data 250 of system 200, for example, geometric positions and/or poses of projectors 207 with respect to screen 215. Similar to model 240, geometric data 250 can be determined using camera 214 and projectors 207, for example, by controlling projectors 207, and the like, to project images, such as boxes, structured light patterns, and the like, onto screen 215 and determine a geometry thereof from pictures acquired by camera 214. Data 109$p$ can comprise geometric data 250.

In any event, using a model of an object onto which images are to be projected, as well as geometric data 250 of system 200, device 201 can be further configured to determine a mapping between projected points of a given image 216 and points of an image modulator of a projector 207 producing the given image 216, as well as a mapping between the projected points of the given image 216 and respective points of respective image modulators of other projectors 207 of the plurality of projectors 207, for example when the projected points of the given image 216 are in an overlap region 217.

Figure 4:
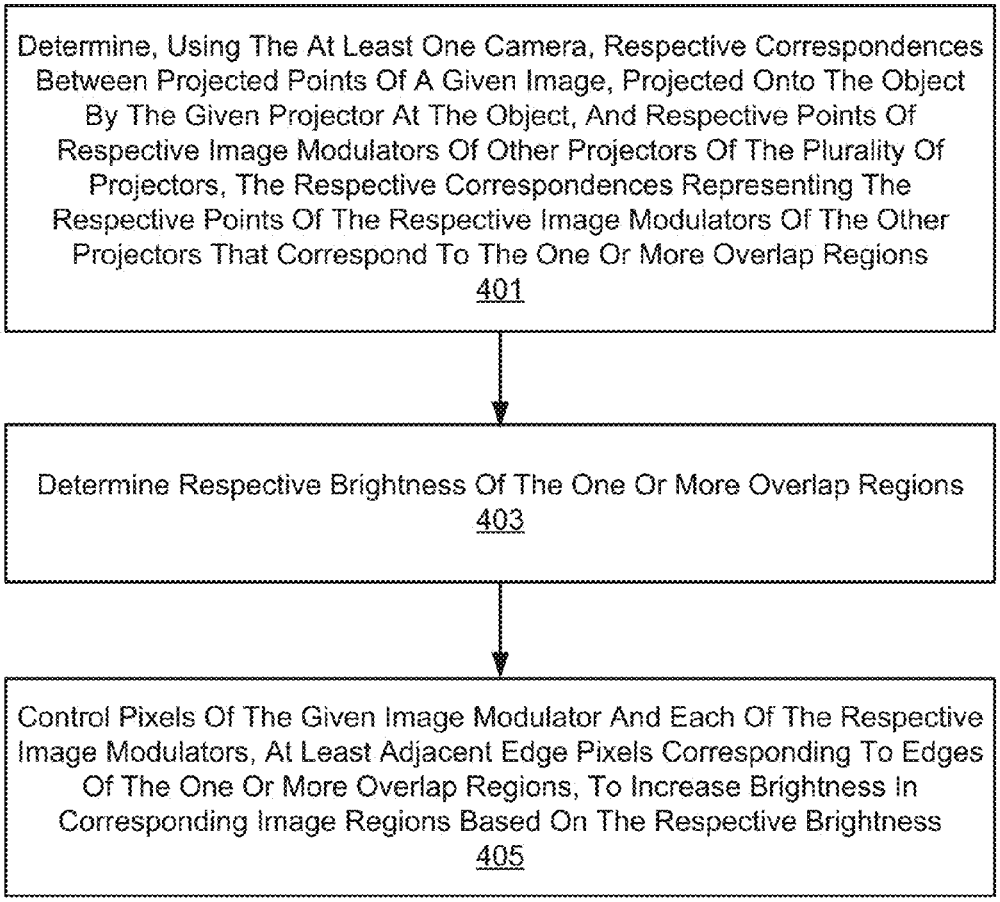
FIG. 4 depicts a method for digital black level blending, according to non-limiting implementations.

Attention is now directed to FIG. 4, which depicts a flowchart of a method 400 for digital black level blending, according to non-limiting implementations. In order to assist in the explanation of method 400, it will be assumed that method 400 is performed using system 200, and specifically by controller 220 of device 201, for example when controller 220 processes application 230. Indeed, method 400 is one way in which system 200 and/or device 201 and/or controller 220 can be configured. Furthermore, the following discussion of method 400 will lead to a further understanding of device 201, and system 200 and its various components. However, it is to be understood that system 200 and/or device 201 and/or controller 220 and/or method 400 can be varied, and need not work exactly as discussed herein in conjunction with each other, and that such variations are within the scope of present implementations.

Regardless, it is to be emphasized, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of system 200 as well. Furthermore, while computing device 201 is described as implementing and/or performing each block of method 400, it is appreciated that each block of method 400 occurs using controller 220 processing application 230.

It is further appreciated that method 400 occurs for each given projector 207 of the plurality of projectors 207, and hence method 400 can be executed in parallel for each projector 207 and/or in a sequence for each projector 207 and/or in parallel for each section/region/scanline/pixel of a projector 207.

At block 401, controller 220 determines, using the at least one camera 214, respective correspondences between projected points of a given image 216, projected onto an object (e.g. the screen 215) by the given projector 207 at the object, and respective points of respective image modulators of other projectors 207 of the plurality of projectors 207, the respective correspondences representing the respective points of the image modulators of the other projectors 207 that correspond to the one or more overlap regions 217.

At block 403, controller 220 determines respective brightness of the one or more overlap regions 217.

At block 405, controller 220 controls pixels of the given image modulator and each of the respective image modulators, at least adjacent edge pixels corresponding to edges of the one or more overlap regions 217, to increase brightness in corresponding image regions based on the respective brightness.

In some implementations, respective correspondences between the projected points and the respective points can occur at least for the edge pixels corresponding to the edges of the one or more overlap regions. For example, while in some implementations, correspondence can be determined primarily for and/or at least for the points of edge pixels, the correspondences can be determined for other points, including, points "inside" the one or more overlap regions, and "outside" the overlap regions. In general, pixels corresponding to regions of a projected image that are in a "drop-off" zone, adjacent an edge of an overlap region, can be controlled to control brightness in the drop-off zone.

Non-limiting implementations of method 400 will now be described with reference to FIG. 5 to FIG. 16.

Method 400 generally assumes that at least one camera 214 can be used to capture digital pictures of screen 215 (and/or any object onto which images 216 are projected) which can be used to determine correspondences between camera 214 and screen 215. In some implementations, digital pictures of markers at screen 215 (which can include the physical edges of screen 215 and/or specific markers at least temporarily placed on screen 215) are acquired by at least one camera 214 to build camera-to-screen correspondences, which is correlated with a three-dimensional (3D) model of screen 215 (e.g. model 240), to get 2D (two-dimensional) camera-to-3D screen correspondences. Device 201 can control projectors 207 to project structured light patterns (including, but not limited to, boxes and the like) from each of projectors 207 onto screen 215, and at least one camera 214 captures digital pictures of structured light patterns at screen 215, which are used by device 201 to determine 2D camera-to-2D projector correspondences. The 2D camera-to-3D screen correspondences and the 2D camera-to-2D projector correspondences can be used to determine 2D projector-to-3D screen correspondences. Indeed, while only one camera 214 is depicted, system 200 can comprise a plurality of cameras and such correspondences can be determined for each of the cameras; further, not all of the plurality of cameras need to obtain digital pictures of all of screen 215; indeed, the plurality of cameras can be aimed at different portions of screen 215.

These various correspondences can be used to determine geometrical relationships in system 200 including, but not limited to, a physical position and direction of projector 207; such correspondence and/or geometrical relationships can be stored as geometric data 250. Geometric data 250, and the like, can be used for any further determinations; alternatively, geometric data 250 and/or geometric relationships between projectors 207 and screen 215 can be determined using best fit polynomials, and the like. Regardless using such methods, a correspondence can be determined between each point of each image modulator of each projector 207 and a projected point on screen 215; in other words, such methods can determine where each projector pixel will land on screen 215, as a projected pixel-region in an image 216.

Attention is next directed to FIG. 5, which schematically depicts projectors 207-X, 207-Y (each similar to projectors 207), screen 215 and cameras 214-Ai, 214-Bj (each similar to camera 214). Projectors 207-X, 207-Y represent two of projectors 207 of FIG. 2, and cameras 214-Ai, 214-Bj represent the at least one camera 214 of FIG. 2. Edges (and/or outlines) of images 216 can be determined, for example, by "forward-shooting" (e.g. from each projector 207-X, 207-Y to screen 215) a grid of sample points (with edges of images 216 depicted in broken lines in FIG. 5) that corresponds to each image 216, and determining their corresponding projected positions (e.g. projected points) on screen 215 using at least one camera 214-Ai, 214-Bj. As the positions of pixels of each image modulator in each projector 207-X, 207-Y have been determined and stored as data 250, pixels of an image modulator of each projector 207-X, 207-Y that corresponds to edges of associated images 216 can be determined (though it is appreciated that the exact position of each pixel need not be stored as data 250, but that data 250 can comprise data from which a position of at least pixels that are projected onto an object and/or screen 215 can be determined). As such, projected pixel-regions (e.g. regions projected onto an object and/or screen 215) for a first projector 207 can be evaluated as to whether they are close to being in an overlap region 217 and hence which could be mapped to pixels in an image modulator of another projector 207.

It is further appreciated that, in FIG. 5, edges of images 216 include an inner edge and an outer edge, the region between the inner edge and the outer edge corresponding to a deadzone of pixels of a respective image modulator which form part of images 216 but which are always off. For example, in DMD image modulators and projectors, "dead" DMD mirrors surround an active area that forms an image (e.g. modulates light), the "dead" DMD mirrors referred to as a "Pond of Mirrors" (POM). The POM is always in an off-state and/or a fixed intermediate state that can be equivalent to an off-state (e.g. the POM reflects light in a manner that can be equivalent to off-state light), but nonetheless provides a "black" border of off-state light to any images projected by a DMD projector; such "black" border can nonetheless have brightness which can contribute to the light in overlap regions 217. For DMDs, the POM can be up to about 20 pixels, but can further be known from information provided with a DMD projector from a manufacturer.

In some implementations, an optional proximity check process can be used to eliminate and/or avoid "false positives" by: forward-shooting a grid of points from a projector 207 to screen 215; determining a maximum distance D on screen 215 of adjacent forward-shot grid points; and storing the maximum distance D along with the positions of the forward-shot grid of points. In addition, any other screen 3D point can be "proximity checked" against this projector 207 by determining whether the screen 3D point is within maximum distance D of any of those forward-shot screen 3D points; if yes, then this screen 3D point is "close enough" to the projected image of projector 207 to consider "backshooting" to projector 207 (as described below); if no, then this screen 3D point is not close enough to the projected image of projector 207 to consider "backshooting" to projector 207.

Either way, a technique which can be referred to as backshooting of projector images and or image outlines onto each other can then occur, using the entirety of images, only pixels that correspond to overlap regions and/or only pixels that correspond to edges and/or outlines (which can include deadzone and/or POM edges). Such a technique is used to determine which pixels in each image modulator of each projector 207 correspond to one or more overlap regions 217. Such a determination can be performed in "2D pixel space" (e.g. pixels at an image modulator) using projector points. For example, in addition to 2D projector-to-3D screen correspondences, 3D screen-to-2D projector correspondences can also be used to determine 2D projector 207-X-to-2D projector 207-Y (e.g. by transforming projector points of a given "X" projector 207 to projector points of another "Y" projector 207). In other words, as in block 401 of method 400, controller 220 determines, using the at least one camera 214, respective correspondences between projected points of a given image 216, projected onto the screen 215 by the given projector 207 at the screen 215, and respective points of respective image modulators of other projectors 207 of the plurality of projectors 207, the respective correspondences representing the respective points of the image modulators of the other projectors 207 that correspond to the one or more overlap regions 217.

In some implementations, block 401 can be implemented by finding a mapping from projector 207-X to a camera 214-Ai to screen 215 to a camera 214-Bj (which can be the same as camera 207-Ai or another camera) to pixel space of projector 207-Y. The technique will be described that system 200 includes a plurality of cameras A1, A2, . . . An (e.g. in other words camera 214-Ai can represent "n" cameras 214) each similar to camera 214, and a plurality of cameras B1, B2, . . . Bm (e.g. in other words camera 214-Bj can represent "m" cameras 214) each similar to camera 214, though in some implementations as few as one camera 214 can be used; regardless each of the cameras are aimed at screen 215. In any event, for example, for any pixel on projector 207-X (e.g. projector 207-1), the projected pixel-region is mapped to each camera 214-Ai (A1, A2, . . . An) that can "see" it, and then mapped to screen 215, for example using previously stored correspondences (and assuming that such correspondences were also determined for each camera). The screen results are then mapped to each camera (B1, B2, . . . Bm—some of which are the same as cameras A1, A2, . . . An) that can see that area of screen 215, and then these are mapped to locations of an image modulator of projector 207-Y. This may not result in a mapping of a single location; rather a mapping of single location can be determined using a weighted-average of the results from each camera, weighted by "confidence" values associated with a respective cameras for the pixel data (e.g. based on how the pixel location relates to the original structured light patterns as captured by camera 214 and/or cameras).

Alternatively, a mapping from projector 207-X to screen 215 to projector 207-Y can be determined using geometry and the calculated projector and screen locations stored in data 250 and/or model 240. This can be performed using a single "global" projector/screen position, and/or using per-camera projector/screen positions (as different geometrical results could be obtained from each camera's data), which may again be merged using a weighted average.

In general, such techniques result in a correspondence between projected points of a given projector 207 to points of an image modulator of another projector, and can further obtain correspondences for all overlap regions 217; when processing power of device 201 is suitable, all projected points can be processed, but to reduce such processing power, only projected points corresponding to edges of images 216 and/or overlap regions 217 can be used, as determined, for example, from the proximity checking evaluation and/or the edge-walking algorithm.

Figure 6A:
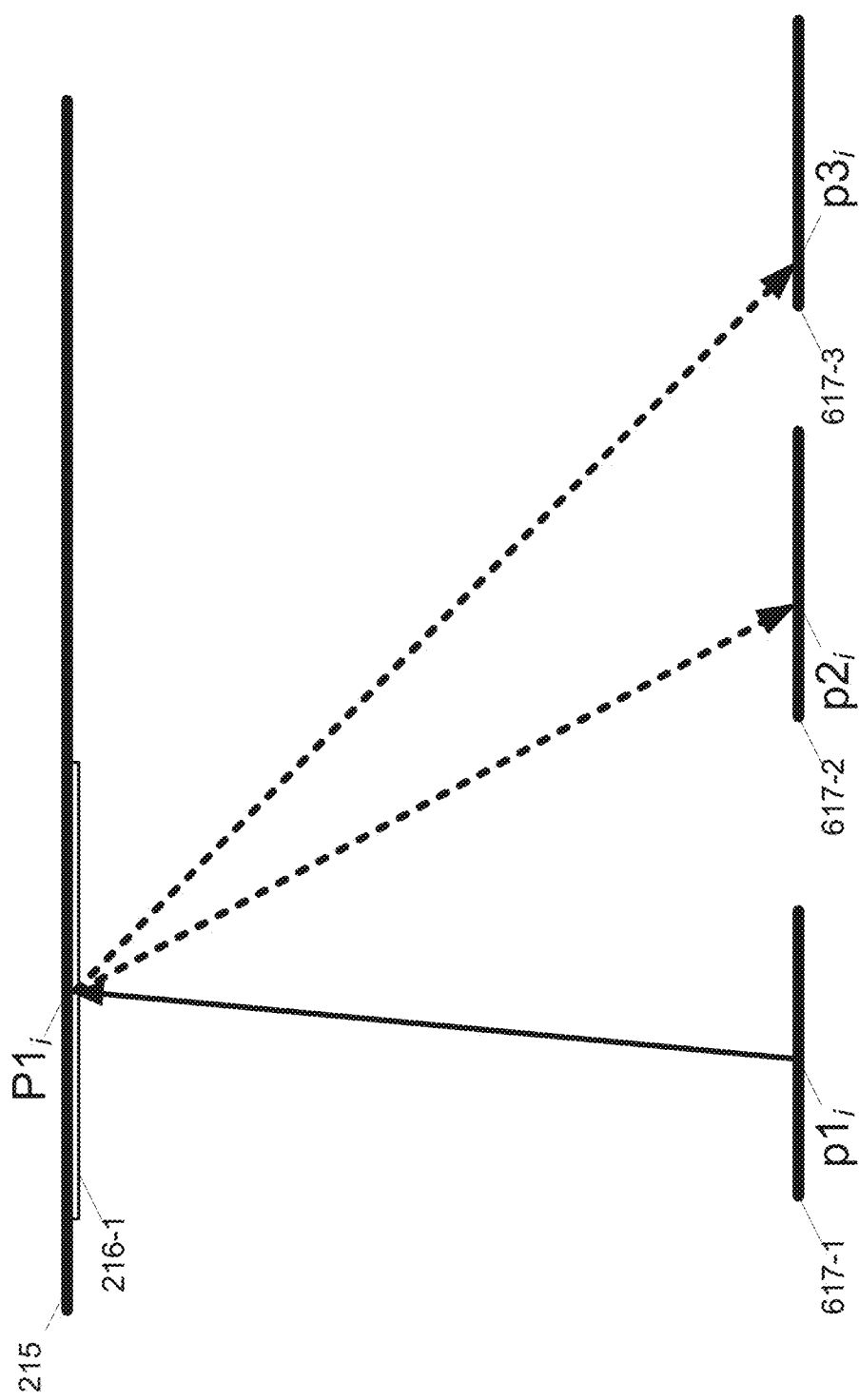
FIG. 6A depicts a backshooting technique used to determine correspondences between projected points of a first projector, and points at image modulators of other projectors, for example in overlap regions, the technique illustrated using a pinhole lens model, according to non-limiting implementations.

Attention is next directed to FIG. 6A which depicts a simplified version of the backshooting technique, assuming a trivial pinhole lens model for projectors 207 (e.g. FIG. 6A provides no details lenses and/or optics in the backshooting technique), though models that take into account the effect of projector lenses and/or optics are within the scope of present implementations such that the backshooting may not occur along straight lines. In any event, a resulting correspondence for a projected point, P1i is illustrated in FIG. 6A, which schematically shows a side view of image modulators 617-1, 617-2, 617-3 (interchangeably referred to, collectively, as image modulators 617 and, generically, as an image modulator 617) for each projector 207 in relation to screen 215; while as depicted each image modulator 617 is depicted as parallel and about equidistant to screen 215, such a depiction is provided merely for clarity and each image modulator 617 can be positioned at other angles to screen 215.

As depicted, a point p1i of image modulator 617-1 corresponds to a projected point P1i for example in projected image 216-1 (which is depicted with some depth at screen 215 in FIG. 6A, merely to indicate a position thereof. In any event, using the previously determined geometric relationships between projectors 207 and screen 215, and alternatively selecting projected point P1i based on its inclusion as an edge of image 216-1, controller 220 determines a point p2*i* at image modulator 617-2 that can be mapped to projector point P1*i* and a point p3*i* at image modulator 617-3 that can be mapped to projector point P1*i*. In other words, each of points p1*i*, p2*i*, p3*i* are points that correspond to an overlap region 217 (not depicted in FIG. 6A). Hence, a correspondence between projected point P1*i* and point p2*i* is determined and a correspondence between projected point P1*i* and point p3*i* is determined by "back-shooting" from projector point P1*i* to each of point p2*i*, p3*i*. When lenses of projectors 207 are considered, the back-shooting path may not be a straight line.

This can be repeated for other projected points in image 216-1 that, for example, correspond to edges of an overlap region 217 and/or have a chance of corresponding to edges of an overlap region 217 to get correspondences between projector points of image 216-1 and points of each of image modulators 617-2, 617-3; furthermore, some projector points of image 216-1 will correspond to points at only one of image modulators 617-2, 617-3. In yet further implementations, this can be repeated for all projected regions in image 216-1, and/or a subset of projected regions in image 216-1, not just projected regions that correspond to edges of an overlap region 217.

For example, even for projected points outside of an overlap region, a mapping can be determined between points of image modulator 617-1 and image modulator 617-2, at least for projected points of image modulator 617-1 that are "near" projected points of image modulator 617-2 (e.g. within a given distance of the projected edges of image modulator 617-2). However, such a mapping maps to points of image modulator 617-1 that can lie outside the bounds of image modulator 617-2. In other words, a point of image modulator 617-1 is mapped to a point outside of a physical space of points projected by image modulator 617-2 can have a negative value (and the like) in a coordinate space associated with image modulator 617-2 (assuming that the physical space of points projected by image modulator 617-2 have positive values). Hence, even if projected point P1$_i$ doesn't coincide with a point projected by image modulator 617-2 (e.g. P1$_i$ is outside any overlap regions), the geometric relationships determined still determine where point p2$_i$ maps onto the coordinate space defined by image modulator 617-2, even if that point is beyond the bounds of image modulator 617-2 (although the accuracy of this mapping may diminish according to a distance of point P1*i* from points projected by image modulator 617-2).

Attention is next directed to FIG. 6B which depicts another example of the backshooting technique illustrated using a simplified version of image modulators 617-1, 617-2, which depicts six pixels per image modulator 617-1, 617-2, though each image modulator 617-1, 617-2 generally comprises thousands of pixels, as indicated by the ellipses in each image modulator 617-1, 617-2. Furthermore, while image modulator 617-3 is not depicted in FIG. 6B, it can nonetheless be present. As in FIG. 6A, the effect of lenses and/or optics on the backshooting technique is ignored for simplicity. It is further assumed that at least the top most and right most pixels in each image modulator 617-1, 617-2 are edge pixels.

FIG. 6B further depicts projected image 216-1, produced by image modulator 617-1, and projected image 216-2, produced by image modulator 617-2. While projected image 216-3 is not depicted, it can nonetheless be present.

Furthermore, in FIG. 6B, an overlap region between images 616-1, 616-2 includes one pixel, as indicated by projected pixel-region PR1*i*. While only one pixel is in the overlap region, in other implementations, tens to thousands of pixels can be in the overlap region.

FIG. 6B further illustrates that projected pixel-regions, as referred to in method 400 for example, can comprise a projected region that corresponds to a pixel of a projected image. However, such projected regions can also comprise projected points and/or any region and/or point of an image that can be mapped back an image modulator, and the like, of a projector.

A correspondence for projected pixel-region, PR1*i* is also illustrated in FIG. 6B. In particular, a pixel px1*i* of image modulator 617-1 corresponds to projected pixel-region PR1*i* for example in projected image 216-1. Using the previously determined geometric relationships between projectors 207 and screen 215, and alternatively selecting projected pixel-region PR1*i* based on its inclusion as an edge of image 216-1, controller 220 determines a pixel px2*i* at image modulator 617-2 that can be mapped to projector pixel-region PR1*i*. In other words, each of pixels px1*i*, px2*i*, are pixels that correspond to an overlap region (e.g. overlap region 217-1). Hence, a correspondence between projected pixel-region PR1*i* and pixel px2*i* is determined by "backshooting" from projector pixel-region PR1*i* to pixel px2*i*. When lenses and/or optics of projectors 207 are considered, the backshooting path may not be a straight line.

Furthermore, more than one pixel at image modulator 617-2 can be mapped to projected pixel-region PR1*i*; for example, two or more pixels at image modulator 617-2 can be mapped to (and/or partially mapped to) projected pixel-region PR1*i*.

Furthermore, a portion of a pixel (e.g. part of a pixel) can be mapped to projected pixel-region PR1*i*; in these implementations, whether or not the entire pixel is included in an overlap region can depend on a size of the portion that is mapped to projected pixel-region PR1*i*, as described in more detail below.

In yet further implementations, points at pixels px1*i*, px2*i* can be mapped to points on or near projected pixel-region PR1*i*, for example corners of pixels px1*i*, px2*i*, and the like.

In other words, the determining respective correspondences between projected points of a given image and respective points of respective image modulators of other projectors 207, of the plurality of projectors, 207, can include correspondences between a projected region and one or more pixels, correspondences between a projected region and one or more points of a pixel, and the like.

Furthermore, transforms can be used to transform pixels to points, and/or points to pixels, and further to determine a degree of overlap between pixels (and/or coinciding points and/or points corresponding to pixels) (e.g. a percentage and the like of a pixel that is in an overlap region). For example, points of a pixel (e.g. corner points) can be transformed to determine a region of a pixel that corresponds to an overlap region. When correspondences are found for a plurality of points within a pixel, the points within a pixel can be used for sub-pixel anti-aliasing. Hence, in the example of FIG. 6B, by finding correspondence between projected pixel-region PR1*i* and corners of pixels px1*i*, px2*i* and/or sub-points of pixels px1*i*, px2*i* (e.g. points within pixels px1*i*, px2*i*), portions of pixels px1*i*, px2*i* in an overlap region 217 can be determined, as well as a size of a portion of each of pixels px1*i*, px2*i* that are in an overlap region.

In any event, determination of such correspondences can be repeated for all projected regions in image 216-1 that, for example, correspond to edges of an overlap region 217 and/or have a chance of corresponding to edges of an overlap region 217 to get correspondences between projector regions of image 216-1 and pixels of each of image modulators 617-2, 617-3; furthermore, some projector regions of image 216-1 will correspond to pixels at only one of image modulators 617-2, 617-3.

Figure 7:
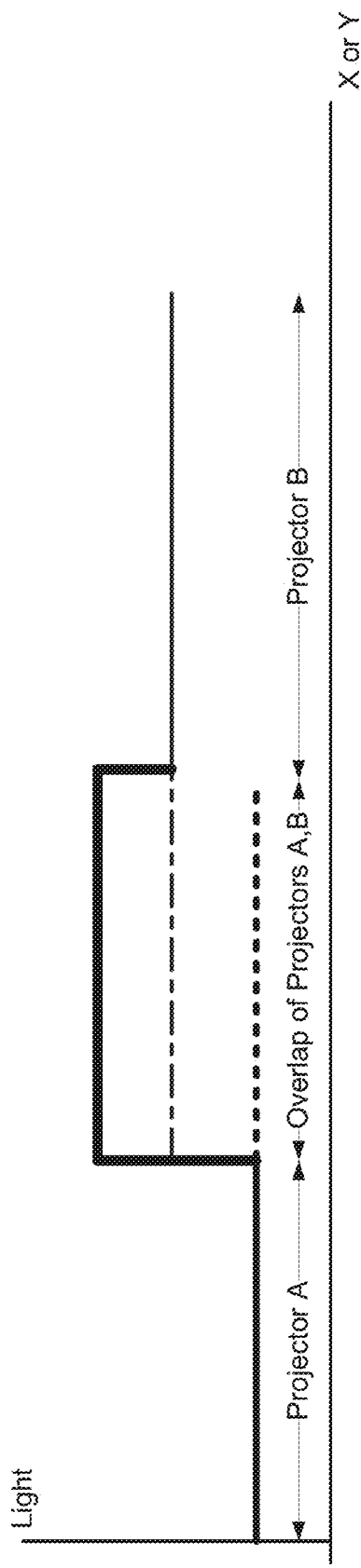
FIG. 7 depicts a staircase diagram for two projectors that includes an overlap region corresponding to visible and/or brighter seam in a overlapping images, according to non-limiting implementations.

Attention is next directed to FIG. 7 which depicts a stairstep diagram of images from a projector A and a projector B and an overlap thereof. Each of projectors A, B can correspond to two of projectors 207. In particular, the stairstep diagram of FIG. 7 comprises a graph of light (measured in one or more lumens, arbitrary units and the like) vs distance (e.g. in an "x" direction or a "y" direction). The distance can correspond to a distance on screen 215 (e.g. in projected space, which can also be referred to as object space and/or screen space (e.g. when the object being projected on is a screen)), or a distance (e.g. in pixel space) at image modulators of projectors 207 (indeed, given the transformations from projected space to pixel space, they are basically isomorphic). In FIG. 7, projector A outputs some amount of light (e.g. in the region labelled "Projector A"), and projector B some other amount (e.g. in the region labelled "Projector B"), and in an overlap region (e.g. in the region labelled "Overlap of Projectors A, B"), light from both projector A and projector B overlaps, which is approximately a linear addition. In the overlap region, the contribution from each of projectors A, B are indicated by respective broken lines extending into the overlap region from each of the "Projector A" and "Projector B" regions, with the total amount of light in the overlap region shown as a solid line above each of the broken lines.

Hence, for example, the regions of FIG. 7 that correspond to light from only one of projectors A, B can correspond to two of images 216, while the overlap region can correspond to an overlap region 217. In general, in this example, the output from projector B is brighter than the output from projector A (e.g. comparing their respective heights against the "Light" axis)

It is apparent that the steep vertical changes in brightness on either side of the overlap region can lead to visual bands in a total image, including images from each of projectors A, B projecting "black". Hence, FIG. 7 depicts the general problem that can be addressed using method 400.

Furthermore, brightness of the overlap region can be determined (e.g. at block 403 of method 400) using one or more of camera, 214 a digital light meter in communication with computing device 201, and/or using manual techniques (and hence the brightness could be entered into device 201 using an input device). Alternatively, brightness of each of projector A, B can be determined individually and the brightness of the overlap region can be determined by adding the brightness of each of projector A, B.

From the correspondences determined as described above (e.g. using block 401 of method 400), pixels of image modulators of each of projectors A, B can be controlled (e.g. using block 405 of method 400) at least adjacent the overlap region to increase brightness, based on the respective brightness of the overlap region.

Figure 8:
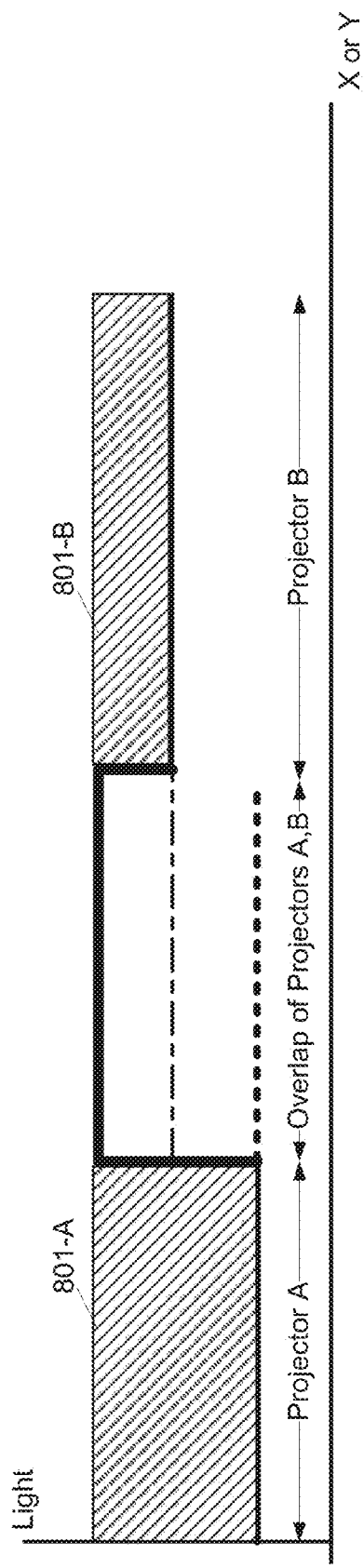
FIG. 8 depicts the staircase diagram of FIG. 7 after brightness of the two projectors is raised for at least a portion of pixels outside the overlap region, according to non-limiting implementations.

For example, with reference to FIG. 8, which depicts a similar stairstep diagram as in FIG. 7, a uniform black level blending technique can be used to raise brightness of all areas of the images outside the overlap region to be similar to the brightness of the overlap region; due to the determined correspondences, the pixels outside of the overlap region can be specifically controlled (e.g. at block 405 of method 400) to increase the brightness of each of projectors A, B (e.g. using respective pixels of respective projector A and projector B). These respective increases in brightness for each of projectors A, B are depicted in FIG. 8 as an increase 801-A in light of projector A, and as increase 801-B in light of projector B, each of the increases 801-A, 801-B outside of, but adjacent to, the overlap region. As depicted, each of the increases 801-A, 801-B extend from edges of the overlap region to an opposite edge of a respective image.

As output from projector B is brighter than output from projector A, more light is added at projector A than at projector B, and hence increase 801-B is less than increase 801-A (e.g. comparing their respective heights against the "Light" axis). Furthermore, the height of increase 801-B of projector B is similar to the height of the initial output of projector A depicted in FIG. 7; similarly, height of increase 801-A of projector A is similar to the height of the initial output of projector B depicted in FIG. 7.

For example, in such implementations, controller 220 can control at least a portion and/or all the pixels of a given image modulator of a given projector 207 and each of a respective image modulators of other projectors 207, outside of one or more overlap regions, and at least adjacent the edge pixels corresponding to the edges of the one or more overlap regions, to increase the brightness in the corresponding image regions to match the respective brightness of the one or more overlap regions.

Figure 9:
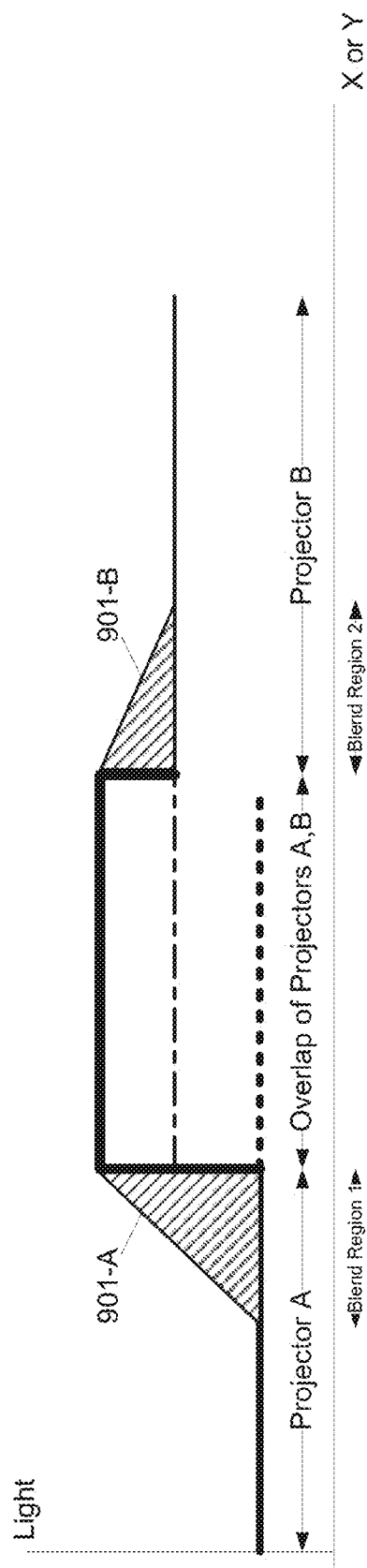
FIG. 9 depicts the staircase diagram of FIG. 7 after brightness of the two projectors is raised in a blending pattern using pixels outside the overlap region, according to non-limiting implementations.

In FIG. 8, the brightness of entirety of images outside the overlap region are increased to the brightness of the overlap region; however, in other implementations, only a portion of the images outside the overlap region is increased, a technique that can be referred to as "blending". Such a blending technique is depicted in a stair step diagram of FIG. 9, which is substantially similar to FIG. 8. In particular, in the blending technique pixels of each image modulator of projectors A, B, adjacent the overlap region, are controlled (e.g. at block 405 of method 400) to increase brightness in a corresponding image regions according to respective distances from edge pixels. These respective increases in brightness for each of projectors A, B are depicted in FIG. 9 as a change 901-A in light of projector A, and as a change 901-B in light of projector B, each of the changes 901-A, 901-B outside of, but adjacent to, the overlap region. As depicted, each of the changes 901-A, 901-B extend from edges of the overlap region and decrease as a function of distance from the edges of the overlap region. Each of the changes 901-A, 901-B are further respectively labelled "Blend Region 1" and "Blend Region 2" in FIG. 9. Hence, FIG. 9 depicts black level blending over a portion of overlapping images.

Figure 10:
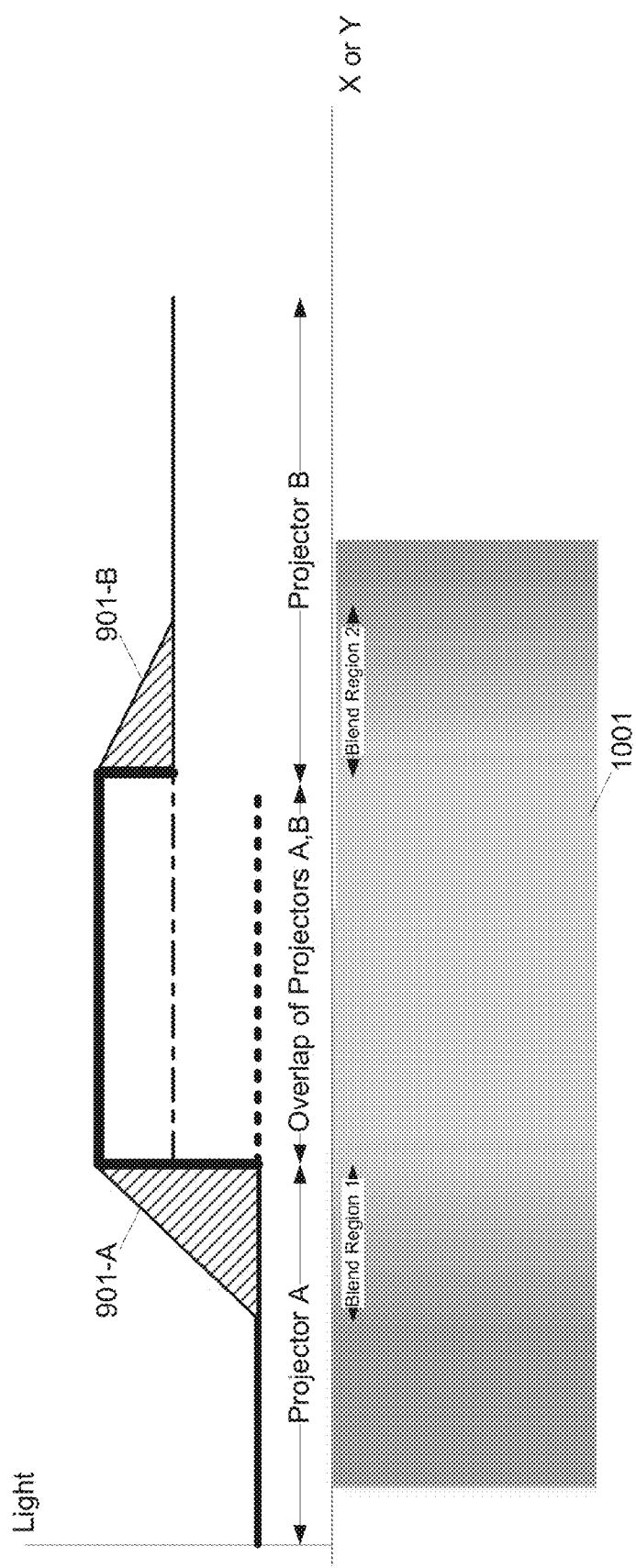
FIG. 10 depicts an example of overlapping images formed using the blending pattern of FIG. 8, according to non-limiting implementations.

In other words, brightness drops off gradually from the overlap region. As depicted, the drop-off in brightness is linear, however other types of drop-offs can occur, including, but not limited to, an "S-curve". The distance over which the blending occurs can be determined heuristically, by a user and/or based on the content of the images. Furthermore, FIG. 10 depicts a view 1001 of how such blending could appear in the overlap region through blending region 1 and blending region 2, with a gradual drop in brightness from the overlap region to an adjacent area outside of the overlap region.

FIG. 5 through FIG. 10 generally depict aspects of method 400; hereafter some specific implementations of method 400 are provided.

Brightness

As depicted in the FIG. 7 to FIG. 9, one projector 207 may be brighter than the other. However, when each projector 207 is projecting an image 216 that corresponds to a black image, it can be challenging to measure absolute brightness of the black levels of the projectors 207, as there is very little light. Very sensitive (and expensive) measurement equipment can be used, but such equipment may not be available either when installing a projector system and/or when such a projector system needs to be realigned or recalibrated months or years later. In such situations, brightness of images 216 and/or overlap regions 217 can be determined (e.g. at block 403) using at least one camera 214.

While at least one camera 214 may or may not be sensitive enough to measure absolute brightness, various techniques can be used to overcome this. In one technique, gain on at least one camera 214 can be increased. In another technique, the brightness of images 216 and/or overlap regions 217 can be measured at various higher levels of light output, and then extrapolation can be used to determine the brightness at lower levels of light output.

In yet a further technique, an area expected (based on the system model) to have similar brightness can be averaged. For example, images having black levels (e.g. black images) may have brightness that is detectable by at least one camera 214, but the brightness may be near a noise floor of at least one camera 214. Hence, at least one camera 214 can determine an average brightness of a relatively larger area than a brightness of a smaller region of interest to obtain a more accurate measurement, as long as the larger area does not include other regions of possible other brightnesses. For example, from a system model, edges of the various overlap regions 217 are known, and hence, average brightness over large areas (e.g. that include a region of interest) can be determined that avoid averaging across different regions.

Furthermore, in yet further implementations, a user could estimate brightness values, and render the resulting black level blend to show results. In other words, in some implementations, device 201 can receive input at an input device (not depicted), that instructs controller 220 to control the regions of images 216 adjacent overlap regions 217 to increase in brightness. Such control can occur in different modes, which could be selected using a menu system and the like, for example in a first mode that causes increase the brightness of the entirety of images 216 outside the overlap regions 217 to increase (e.g. as in FIG. 8); or in a second mode that causes only a portion of the brightness of the images 216 outside the overlap regions 217 to increase (e.g. as in FIG. 9). In other words, a user could manually adjust brightness of images 216 outside the overlap regions 217, one-by-one, collectively, and combination thereof, and controller 220 can be configured to identify and control the regions of images 216 outside the overlap regions 217.

For example, as depicted in FIG. 7 and FIG. 8, the increase 801-B of light to correct projector B to the brightness of the overlap region is about equal to the initial brightness of light being produced by projector A in FIG. 7, and the increase 801-A of light to correct projector A to the brightness of the overlap region is about equal to the initial brightness of light being produced by projector B in FIG. 7 (e.g. the brightness in the overlap region is about equal to an addition of the brightness of each of projectors A, B; hence, to bring projector B up to the level of the overlap region, the increase 801-B is about equal to the initial brightness of projector A, and vice versa). Thus when a user estimates the brightness level of projector A (e.g. independent of projector B), and controls device 201 to in turn increase the brightness of an image 216 produced by projector B outside the overlap region, the projected outer edges of projector A adjacent the overlap region generally disappear (where the lower broken lines end in each of FIG. 7 and FIG. 8).

Indeed, this occurs even when the brightness level of projector B has not yet been estimated (as it effectively falls out of the equation as, later, only the region of an image 216 outside the overlap region is increased). However, such an increase of the brightness of an image 216 produced by projector B can be controlled iteratively to form better estimates of the brightness: when a region of an image 216 produced by projector B outside the overlap region is too bright (e.g. a transition from the overlap region to an adjacent region is visibly noticeable), the estimate is lowered; and, when a region of an image 216 produced by projector B outside the overlap region is too dim (e.g. again, a transition from the overlap region to an adjacent region is visibly noticeable), the estimate is raised.

However a user can be replaced with at least one camera 214 by:—using at least one camera 214 to estimate brightness levels; performing black level calculations using the estimates from the at least one camera 214 and adjusting the brightness levels of projectors A, B (e.g. projectors 207), e.g. outside of the overlap region; capturing the results with at least one camera 214 to determine which areas are too bright or too dim; and modifying the estimates based on these results, and repeat. In other words, method 400 can be performed iteratively by comparing the brightness of the overlap regions 217 with brightness of adjacent regions (e.g. areas corresponding to increases 801 and/or changes 901). Similarly typical line-detection algorithms can be used to determine whether captured camera images still contain lines representing the overlap edges, and/or whether the edges have disappeared.

Partially Overlapping Pixels

Figure 11:
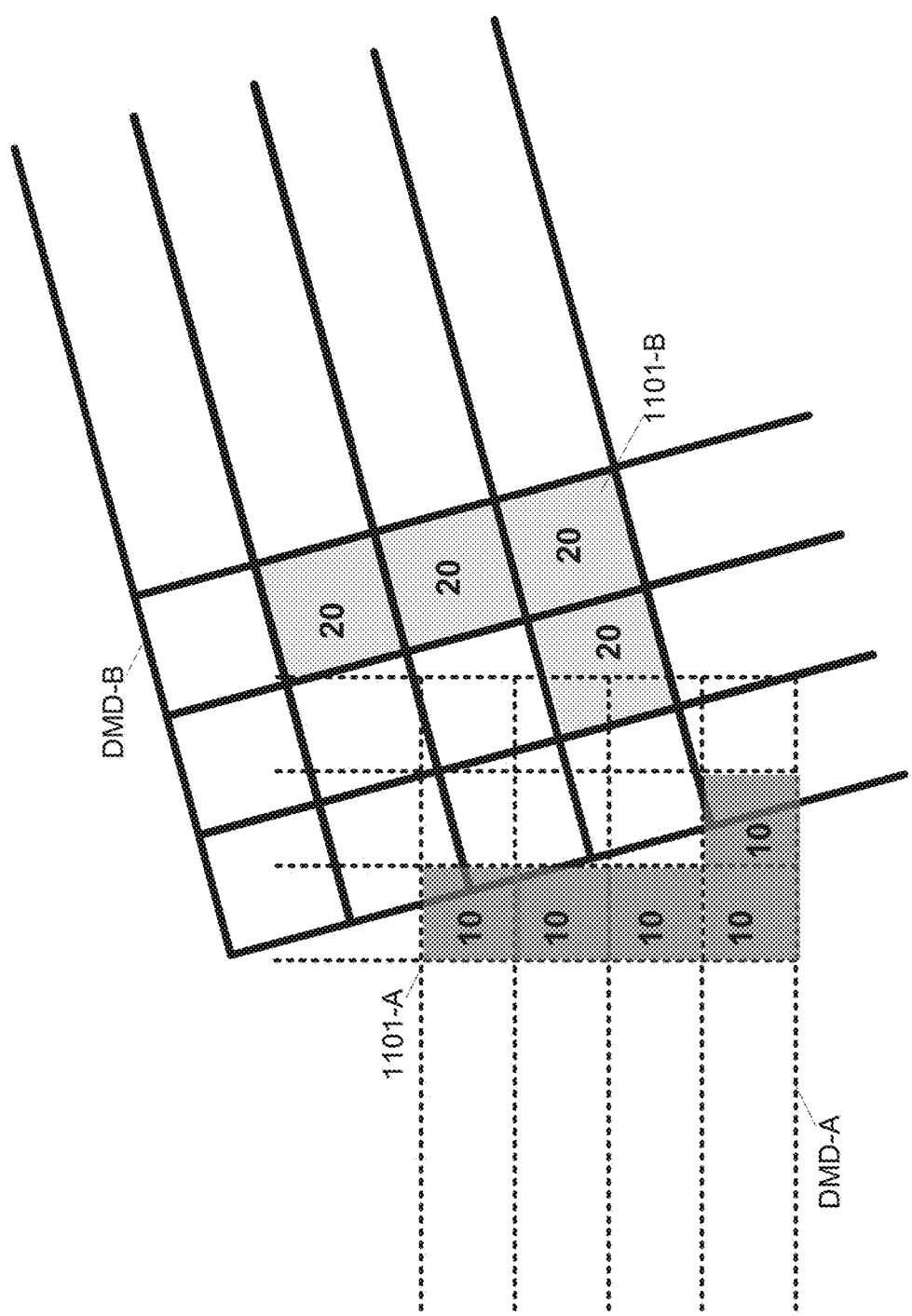
FIG. 11 depicts overlapping image pixels from two projectors, for example at a screen, according to non-limiting implementations.

In some projectors, such as DMD-based projectors, brightness of individual pixels are controllable between two states: on on-state and an off-state, though levels of brightness can be controlled using techniques that include, but are not limited to, dithering and bit-planes. In other words, a pixel in such projectors is a single unit and a portion of such a pixel cannot be adjusted relative to another portion of the same pixel. Hence, when a brightness of a pixel is changed the brightness of the entire pixel is changed. When pixels in images produced by such projectors overlap, but not exactly, some projected regions from a projected pixel can be outside an overlap region, while other projected regions from the same projected pixel can be inside an overlap region. This situation is depicted in FIG. 11 which depicts a portion of projected image pixels from two DMD projectors (eg. DMD-A, the portion of the image of DMD-A being depicted in broken lines, and DMD-B, the portion of the image of DMD-B being depicted in solid lines), which transform digital pixels (e.g. of color) into projected light. However, while the following example is described with respect to DMD based projectors, the following example can apply to other types of projectors where brightness of an entirety of a pixel is controllable, and not portions of pixels.

Projected pixels 1101-A are projected pixels of the image of DMD-A adjacent an overlap region, and projected pixels 1101-B are projected pixels of the image of DMD-B adjacent the overlap region. Each of projected pixels 1101-A, 1101-B are shaded to distinguish them from projected pixels in the overlap region between projected pixels 1101-A, 1101-B. A nominal example brightness of each of projected pixels 1101-A, 1101-B are also depicted. For example, all projected pixels 1101-A are nominally a brightness of 10 units, while all projected pixels 1101-B are nominally a brightness of 20 units; hence, in the overlap region, the brightness will be about 30 units.

Hence, in FIG. 11, none of the projected pixels 1101-A, 1101-B of either of DMD-A, DMD-B are controlled for black level blending, and hence the overlap region of the depicted images appears brighter than adjacent non-overlapping regions of each of the images. Depending on resolution, distance from projectors to screen, lenses, etc. the projected pixels of one projector A, B may not align with the projected pixels of another projector A, B. Hence, this can create problems in controlling the pixels of each DMD adjacent the overlap region. For example, some projected pixels 1101-A from DMD-A only partially overlaps pixels from DMD-B, and only some projected pixels 1101-B from DMD-B only partially overlaps pixels from DMD-A. In other words, along a line where an edge of the image from DMD-B overlaps the image from DMD-A, the projected pixels from DMD-B do not align with the projected pixels from DMD-A. Indeed, a respective edge of a projected pixel from DMD-B might cross through the middle of DMD-A's projected pixels. This could mean that the projected regions of a DMD-A projected pixel that overlap a DMD-B projected pixel should not be given extra light (since the overlap is already bright) according to method 400, whereas other projected regions of the same DMD-A projected pixel that do not overlap a DMD-B projected pixel should be given extra light, according to method 400 (to bring its brightness closer to the overlap brightness). However, one region of a single DMD projected pixel cannot be controlled differently from another region of the same single DMD projected pixel: light can be added to the entire projected pixel or not.

However, a DMD pixel can be controlled to a given brightness level, using dithering and/or bit planes, for example, an amount of additional light added to each of projected pixels 1101-A, 1101-B can be controlled, for example proportional to a degree of overlap on a per pixel basis.

Figure 12:
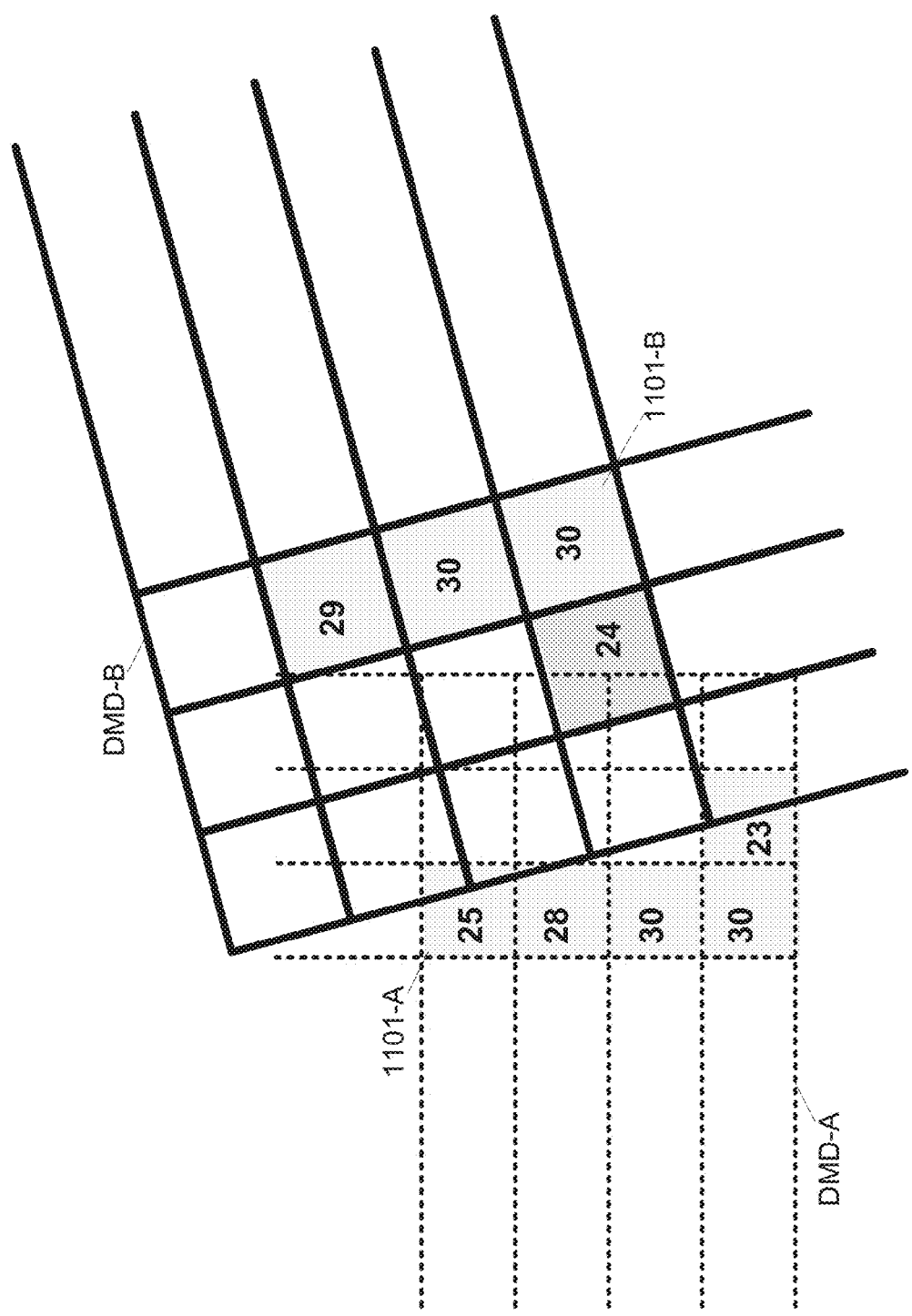
FIG. 12 depicts the overlapping image pixels of FIG. 11 with certain edge pixels highlighted to show degrees of overlap, according to non-limiting implementations.

This is depicted in FIG. 12, which is substantially similar to FIG. 11, with like elements having like numbers. In particular, projected pixels 1101-A, 1101-B are increased to a brightness of 30 units unless they only partially overlap; then the amount that brightness is increased is related to the degree of overlap. Hence, three of projected pixels 1101-A which partially overlap projected pixels of DMD-B are controlled to values of less than 30 units (e.g. 25 units, 28 units and 23 units) depending on a degree of overlap, which can be determined at block 401 of method 400; and two of projected pixels 1101-B which partially overlap projected pixels of DMD-A are controlled to values of less than 30 units (e.g. 29 units and 24 units) depending on a degree of overlap, which can be determined at block 401 of method 400.

However, depending on projector resolution, screen size, viewing distance, and pixels sizes, the only partially overlapping projected pixels of FIG. 12 may still be visible to a viewer (for example, when a resolution of the images 216 is less than "retinal resolution" of a human vision system). Hence, a line of projected pixels where one side is overlapped by projected pixels of another projector, can appear brighter than an opposite side, may result in a visible line to a viewer. The brightness of such lines can be further reduced and/or blended and/or hidden using various forms of dithering or introduction of some noise/randomness, such that the line isn't a solid brightness, and instead varies over distance, such that the line is less visible to the viewer.

Pixel Size Variance

Attention is next directed to FIG. 13 which again depicts a portion of image pixels (e.g. projected pixels) from two projectors (e.g. an image from a first projector labelled "Projector X" and an image from a second projector labelled "Projector Y"), however, the projected pixels of each projector X, Y are of different sizes and furthermore, the sizes can vary (e.g. pixel size variance). Not only are the projected pixels from projector X a different size than the projected pixels of projector Y, but even within a single projector X, Y, the resultant "size" of a "projected pixel" on an object/screen (e.g. the size of the area of an object, such as a screen, that is lit by the light projected from that pixel of an image modulator from the projector) varies from one projected pixel to the next, on the same image modulator, due to the angle of the projection and/or curvature of the object/screen and/or lensing etc.

Figure 13:
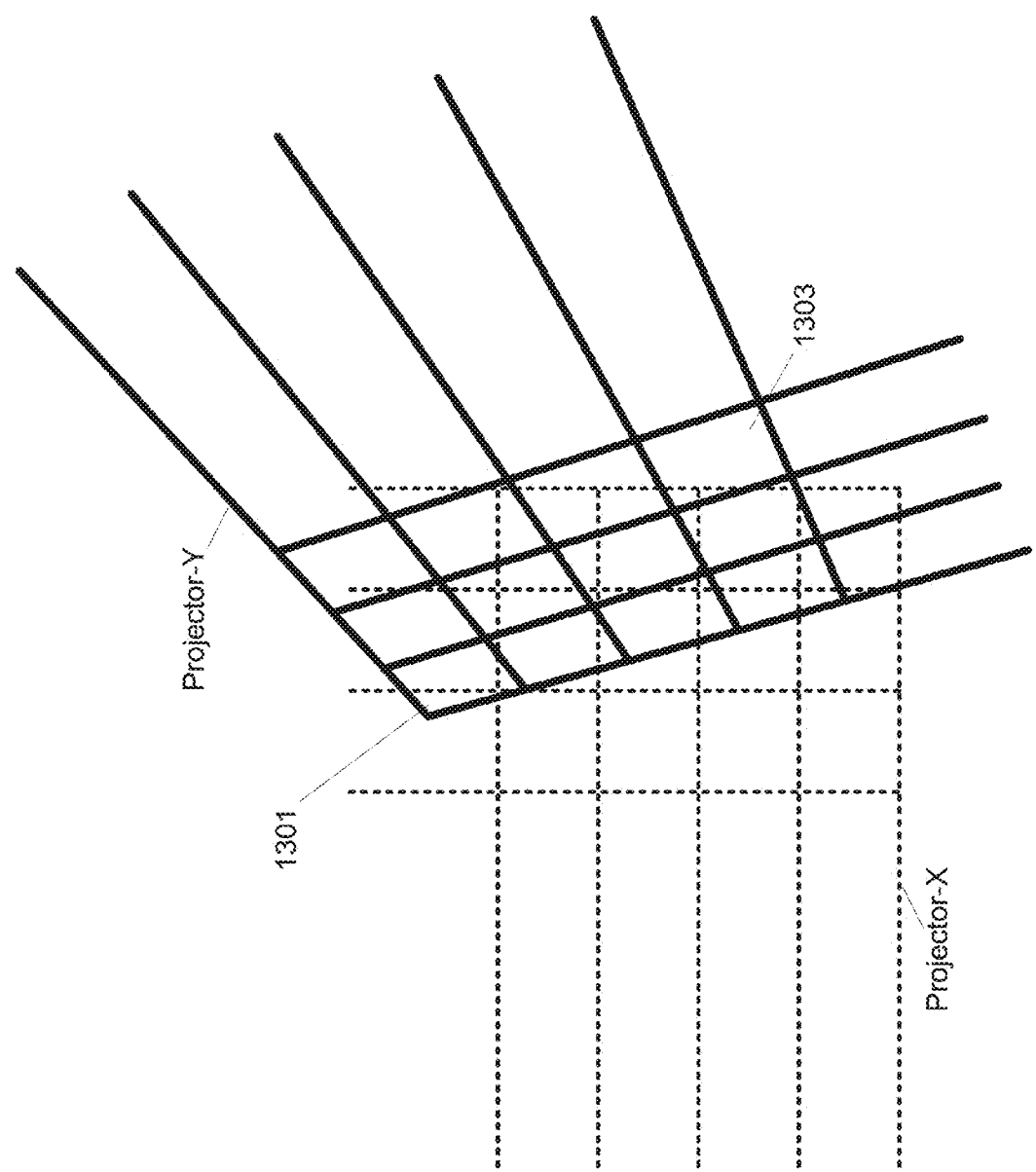
FIG. 13 depicts overlapping image pixels from two projectors with image pixel size varying in at least one of the images, according to non-limiting implementations.

Hence, though not depicted: the lines of each image in FIG. 13 can also be curved, on a curved screen and/or when projected through a fish-eye lens, for example.

In any event, as depicted, a size of a projected pixel 1301 of projector Y is smaller than a size of a projected pixel 1303 of projector Y, however other projected pixels of projector Y may be smaller than projected pixel 1301.

As an area of each projected pixel in a respective image decreases, the projected pixels increase in brightness as the same amount of light is concentrated in a smaller area, assuming that an integrated brightness for each projected pixel in a respective image is similar. Similarly, as an area of projected pixels increase, the brightness decreases. Hence, for example, a brightness of projected pixel 1301 will be higher than brightness of projected pixel 1303.

Thus, when method 400 is applied in these scenarios, projected pixel size can be taken into account. For example, at block 401, positions of each of the four corners of a projected pixel can be mathematically determined such that a size of a projected pixel can be determined, and thus a relative brightness thereof, as well as how the respective projected pixel would increase in brightness with additional light added at block 405 of method 400. In some of these implementations, to reduce processing resource usage, respective sizes of only a grid of sample projected pixels can be determined, and a respective size of projected pixels therebetween can be interpolated.

In yet further scenarios, differences in brightness in projected regions can be taken into account. For example, pixel brightness of an image can also be affected by a projector's bulb, optics and/or items/occlusions between a projector and an object onto which the projector is projecting the image. Indeed, a center of projection can be slightly brighter than an edge of projection (particularly at corners), due to the bulb and/or optics. Such a difference and/or change in brightness can be accounted for by receiving (e.g. from a manufacturer and the like) a typical "drop off" in brightness for a given projector based make/model/brand/etc, and/or by measuring a change in brightness across a single projector by projecting a white or grey (or similar) image, and measuring the brightness across the image (e.g. using a camera and/or light-meter, for example). Alternatively, a projector can project colored images (e.g. in individual color planes, such as red, green, and blue, individually), and brightness for each plane can be determined. Alternatively, a "mask" for occlusions can be supplied (e.g. such a mask could be a drawn with computer software and the like). In any event, such brightness data and/or masks could be provided to device 201, which could use such brightness data and/or masks when determining how to change brightness of image regions in method 400.

Brightness Based on Distance to Overlap Region

Figure 14:
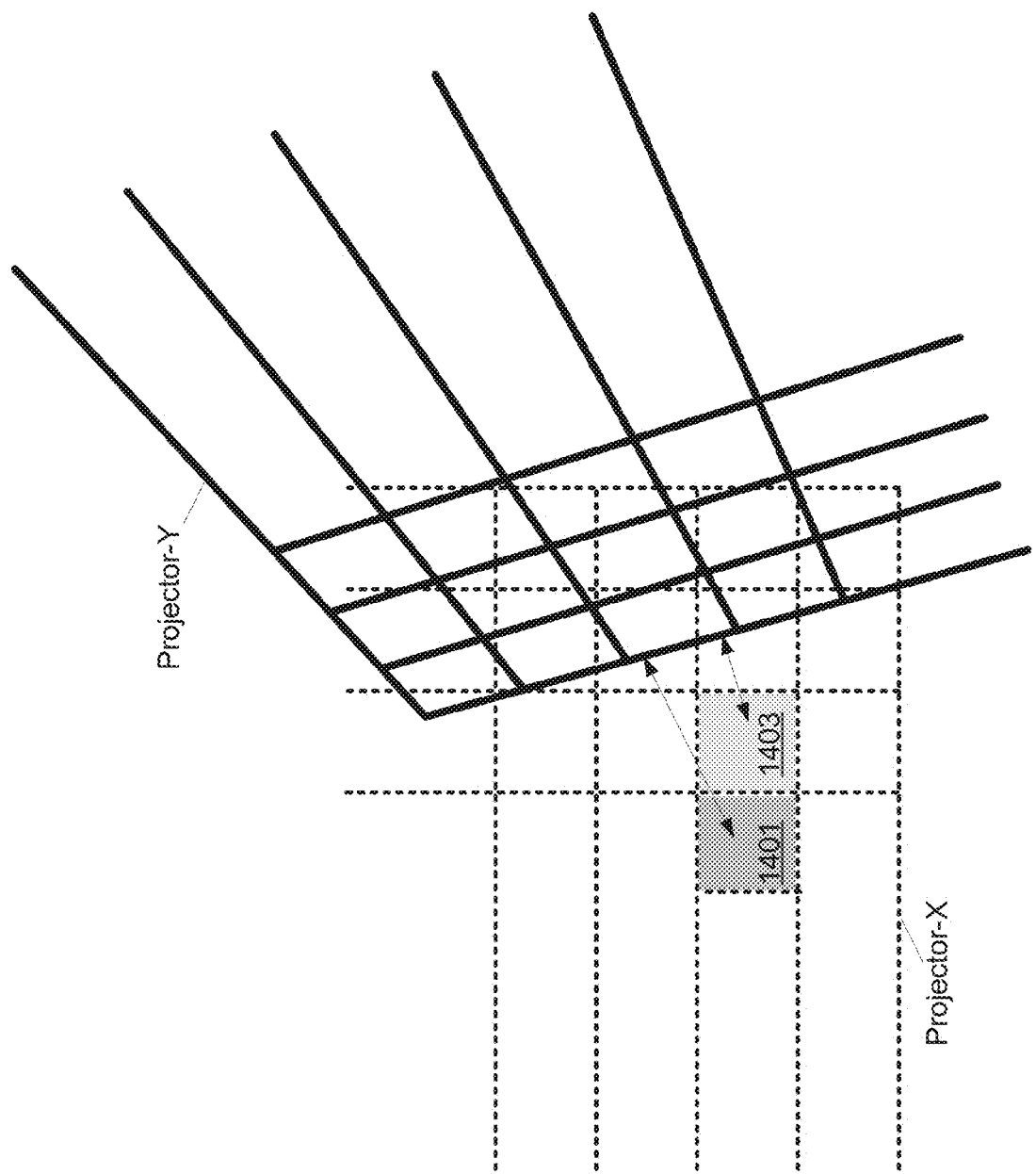
FIG. 14 depicts the overlapping image pixels of FIG. 13 along with a depiction of distance from an edge of an overlap region being used to control brightness, according to non-limiting implementations.

Attention is next directed to FIG. 14, which is similar to FIG. 13, with projected pixels of projector Y varying in size. Furthermore, FIG. 14 depicts an implementation of method 400 in which distance to an overlap region can be used to control brightness of projected pixels adjacent an overlap region. In particular, similar to the implementation of FIG.

9, when "sloping" and/or changing the brightness away from an overlap region, light can be added to projected pixels based on their distance to an edge of overlap region, such that brightness of projected pixels closer to an edge of an overlap region is increased more than projected pixels further away from the edge of an overlap region. To determine distance to an edge, data structures, that include, but are not limited to, KD-trees (k-dimensional trees), can be used to make finding the closest regions and/or points and/or pixels reasonably fast.

For example, in FIG. 14, respective distances from a center of each of projected pixels 1401, 1403 of projector X to an edge of the image of projector Y is determined, using the corners of projected pixels of projector Y as reference points for the edge (though other points of the projected pixels of projector Y could be used), the distances indicated by the respective arrows. The increase in brightness of projected pixel 1403 can be greater than the increase in brightness of projected pixel 1401 as projected pixel 1403 is closer to the edge of the image of projector Y than projected pixel 1401.

Similar techniques can be used when more than two images from more than two projectors overlap such that there is more than one overlap region. For example, attention is next directed to FIG. 15, which depicts portions of three images from each of a projector X (the image labelled "Projector X" and drawn in broken lines), a projector Y (the image labelled "Projector Y", and drawn in solid lines), and a projector Z (the image labelled "Projector Z", and drawn in heavy broken lines), the images overlapping (e.g. as in FIG. 2).

In these implementations, some overlap regions have two images overlapping (as with overlap regions 217-1, 217-2, 217-3), and some overlap regions have three images overlapping (as with overlap region 217-4). Hence, an amount of brightness to add to each region (e.g. outside the overlap regions) and to which projector, becomes somewhat more complicated. In particular, the extra light to be added is split between all the projectors X, Y, Z in the overlap region(s). It can be split evenly, or split with a weighting based on which projected pixels are brightest (based on size, for example) and most likely capable of producing the extra light.

Figure 15:
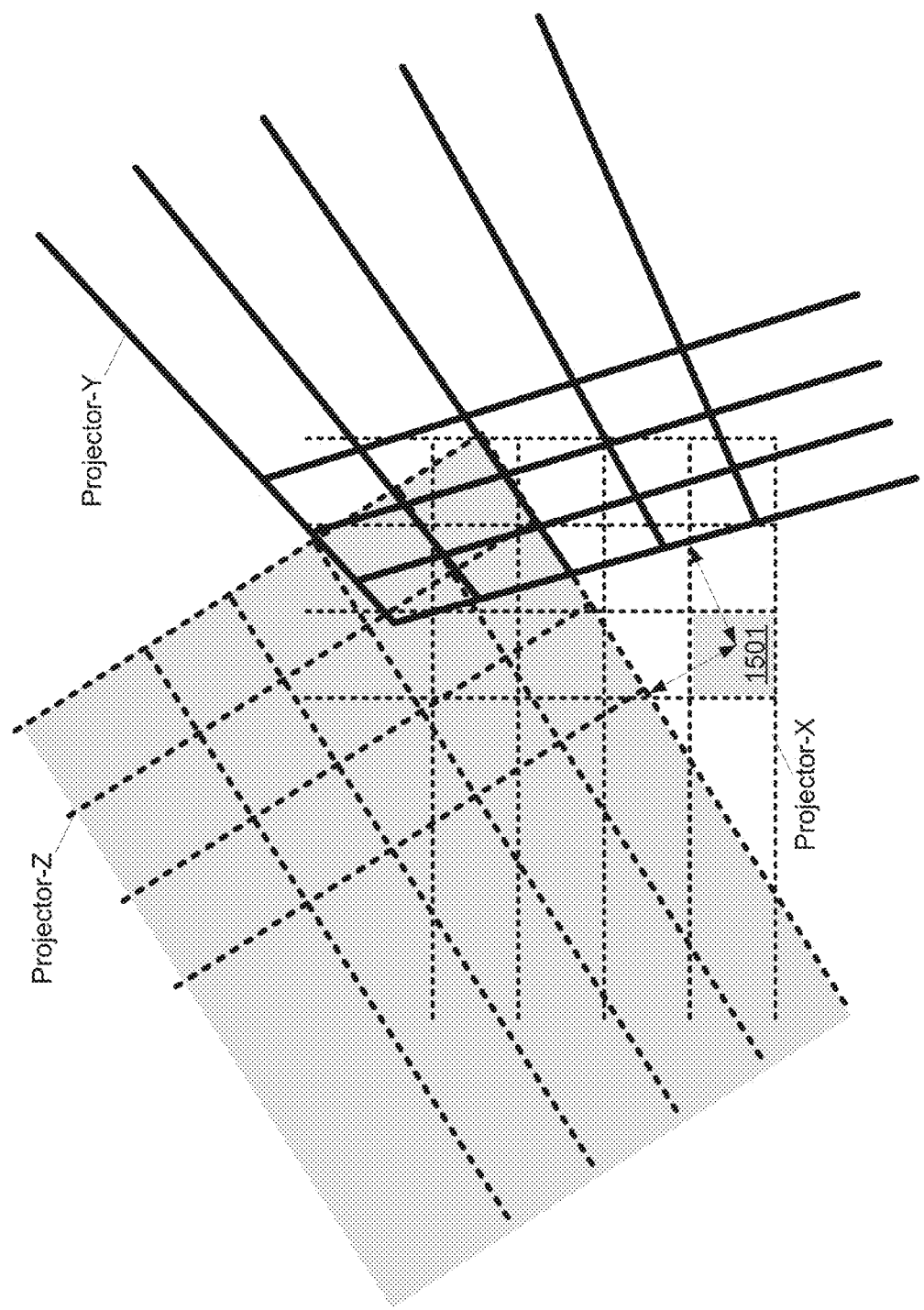
FIG. 15 depicts three overlapping images overlapping, according to non-limiting implementations.

In other words, "distance to overlap" gets much more complicated, and method 400 can be adjusted to determine, for each pixel adjacent more than one overlap region: a closest overlap region edge, brightness of each overlap region and/or which is brightest (ie which slope should be followed for a given projected pixel). There are several possibilities for determining how to increase brightness of a given projected pixel adjacent more than one overlap region:

A. Increasing brightness based on "Most Influential" edges: in this technique, for a given projected pixel, such as projected pixel 1501, nearest overlap region edges are determined (e.g. for speed this technique can use edges stored in a KD-tree formation and/or using "buckets" of KD-trees); an increase in light needed raise the brightness of the given projected pixel towards the brightness of each respective closest edge is determined (e.g. for pixels away from an edge, the brightness is raised but not necessarily all the way to a brightness of an edge pixel); and the largest increase is used. For example, as depicted in FIG. 15, the two closest edges to projected pixel 1501 are indicated with the two arrows, and the brightness of projected pixel 1501 is raised to the larger of the two increases.

Furthermore, when a "left" edge is brighter, but farther away from pixel 1501, the brightness of pixel 1501 could be raised with respect to the "right" edge, whichever has the largest increase. For example, a "Most Influential" edge can be determined from a function max(increase1, increase 2, . . . ), which determines a maximum of a plurality of increases (increase1, increase 2 . . . ), one increase for each edge. B. Increasing brightness based on "Cumulative Edges"; technique, for a given projected pixel, such as projected pixel 1501, nearest overlap region edges are determined (as in the "Most Influential" technique); an increase in light needed to raise the brightness of the given projected pixel towards the brightness of each respective closest edge is determined; and a sum of the increases is used. For example, cumulative increase can be determined from a function sum (increase1, increase2, . . . ), which sums the plurality of increases (increase1, increase 2 . . . ), one increase for each edge. It is appreciated, however, that other functions similar to sum( ) and/or max( ) could be used to determine a brightness increase for a given pixel.

Pond of Mirrors

Figure 16:
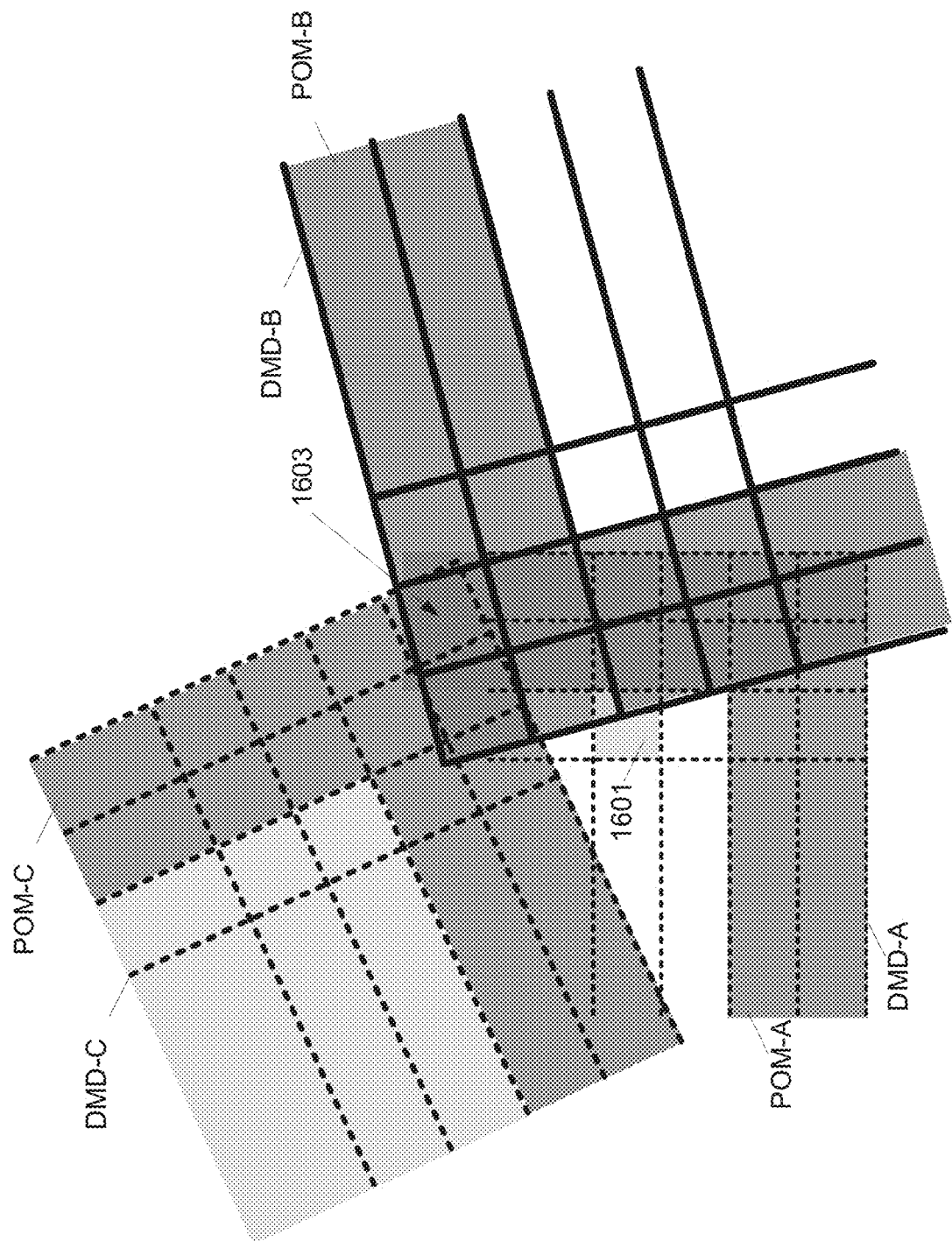
FIG. 16 depicts ponds of mirrors in overlapping images, according to non-limiting implementations.

As mentioned above, in DMD projectors, and with reference to FIG. 16, around each DMD there is a "pond of mirrors" (POM). In particular, FIG. 16 is similar to FIG. 11, however a third image from a third DMD-C (the third image labelled "DMD-C") overlaps images from DMD-A and DMD-B. As also depicted in FIG. 16, the shaded areas at the edges of each of images DMD-A, DMD-B, DMD-C correspond to a POM of each and are hence labelled POM-A, POM-B, POM-C. In other words, each POM comprises a few pixels/mirrors along the edges of DMD pixels/mirrors that cannot be controlled—they always give off minimal light (black level light) and cannot have light added or subtracted. When relatively bright content is being projected (e.g. as determined using threshold values and/or by comparing relative pixel brightness against relative threshold differences), any nearby non-POM projected pixel are much brighter, and thus the POM projector pixels can generally be ignored. However, when POM projected pixels form part of an overlap region and/or are in an adjacent region (displaying black, or near black) the brightness of the POM projected pixels are taken into account when implementing method 400, even if their brightness can't be changed.

For example, whenever method 400 leads to a determination that extra light would ideally be added to POM projected pixels, that light must instead be added to non-POM projected pixels in the area. For example, in FIG. 16, the projected pixel 1601 of the image of DMD-A, as well as projected POM-B pixels are adjacent an overlap region 1603 where all three images overlap. The projected pixel 1601 can be controlled to produce extra light, but the POM-B projected pixels overlapping projected pixel 1601 cannot be controlled to produce extra light. Hence, in method 400, at block 405, a brightness of projected pixel 1601 is increased to produce all the required extra light determined for both projected pixel 1601 and the POM-B projected pixels adjacent overlapping region 1603.

It is further appreciated, however, that for projection technologies other than DMDs, POMs could be not present and/or a POM size could be 0, which can simplify the techniques described herein.

Colored Black

It has been assumed heretofore that each of projectors 207 (and the like) produce similarly colored black levels. However, in practise, different projectors can produce black levels that vary in color, however small. For example, one projector may produce black level light that is slightly red, another projector may produce black level light that is slightly blue, etc. Hence, when extra light is added to projected pixels adjacent overlap regions, color transitions may still be visible. In these implementations, method 400 can be modified to account for such color differences in at least two ways:

A. Light (e.g. uniformly colored light) can be added to the overlap regions, not just to the adjacent "ramp-up" regions. With the added light in the overlap regions, the perceived color thereof can be controlled at least at the edges such that the edges of the overlap regions are close to, and/or similar to, and/or the same as, the color of the adjacent non-overlap regions. Furthermore, the color across the overlap regions can be blended away from the edges. For example, in this technique, as uniformly colored light is added, the color of regions isn't explicitly controlled; rather the uniformly colored light is used to "wash out" the regions.

B. Colored light can be added to the regions adjacent the overlap regions such that brightness and color is added and the natural color of the projectors is neutralized and/or blended into the color of the overlap regions. With this technique we will be ramping up the brightness as it tends towards the overlap as well as changing the color over the ramp to achieve the final color in the overlap region (just as we get there).

In other words, in both techniques, color of one or more of the overlapping regions and adjacent regions is changed to color match and/or color blend.

Method 400 can be yet further modified, as described hereafter.

Anti-Aliasing

Along the edges of overlap regions (adaptive) anti-aliasing can be applied, to assist minimize the notice-ability of the edge, similar to the technique depicted in FIG. 12.

Adaptive Solving

Calculating the required added light for every pixel on every projector can be slow. Hence, in some implementations, method 400 is performed on every Nth projected pixel to determine how to increase brightness at block 405, and interpolation is used to determine how to increase brightness of the remaining projected pixels. Such a technique can reduce use of processing resources and increase speed of application of method 400. Furthermore, such interpolation can be adaptive: for example, when, within a region, a discrepancy between Nth pixels is too large, and/or above a threshold value, (e.g. comparing a determined brightness increase for a k*Nth projected pixel vs. determined brightness of the (k+1)*Nth projected pixel (e.g. a "next" pixel, whether left-to-right and/or above-to-below")), a brightness increase of every N/2 projected pixel within the region can be determined (though this can reduce the speed of implementation of method 400), and then interpolation can again be used. If the discrepancies are still above a threshold, brightness increase of every N/4 projected pixel within the region can be determined, etc.

Overlap Zones (Paint by Numbers)

For the implementation of method 400 depicted in FIG. 8, where the brightness of an entire portion of an image outside an overlap region is increased to the brightness of the overlap region, instead of calculating each an increase in brightness of each projected pixel, a determined brightness increase of a first projected pixel in a scanline (assuming method 400 is applied on a pixel-by-pixel basis across lines of images) can be assumed to be the same across the scanline until an overlap region is reached. Then method 400 is used to determine an increase in brightness for a next scanline, and/or in the next non-overlap region, until a next overlap region is reached. Such a technique can be similar to flood-fill algorithms, can be colloquially referred to as a "paint-by-numbers" technique, as projected pixel in a given region outside an overlap regions, is increased to a same brightness.

However, in this technique, when compensating for projected pixel size and/or brightness, as in FIG. 13, each projected pixel may have a different brightness increase. To approximate brightness increases for each projected pixel, and to minimize "costly" (in terms of processing resources) backshooting calculations, a brightness of an average sized projected pixel can be determined using method 400, and then the brightness of each respective projected pixel can be adjusted proportionally based on its actual respective size.

Heretofore, implementations have been described which refer to at least one camera 214 capturing digital picture of an object, such as the screen 215. However, it is appreciated that the at least one camera 214 comprises a sensor (including, but not limited to, a CCD, an LCOS device, and the like) configured to acquire digital images (and/or pictures) of at least portions of the plurality of images 216 projected onto the object. The images 216 can alternatively be referred to projector images 216 to distinguish them from digital images, and the like acquired by the sensor of the at least one camera 214.

Furthermore, the at least one camera 214 and/or the sensor thereof, does not necessarily acquire digital images of the entire object, or even portions of the object; rather, the at least one camera 214 and/or the sensor thereof is configured to acquire digital images of at least portions of the plurality of projector images 216 projected onto the object. For example, in some implementations, the projector images 216 can be projected using infrared light, and/or ultraviolet light, and/or light of a frequency that is not viewable by (and/or non-visible to) a human vision system (e.g. a human and/or a system configured to image objects in a manner similar to a human). Furthermore, the at least one camera 214 and/or the sensor thereof can be configured to acquire digital images of the same "non-visible" light, and not "visible" light. In these implementations, the at least one camera 214 and/or the sensor thereof acquires digital images of at least portions of the plurality of projector images 216 projected onto the object, but not necessarily of the object.

Hence, in these implementations, the method 400 is adapted such that the controller 220 is configured to: determine, using at least one sensor (e.g. of at least one camera 214), respective correspondences between projected points of a given projector image 216, and respective points of respective image modulators of other projectors 207 of the plurality of projectors 207, the respective correspondences representing the respective points of the image modulators of the other projectors 207 that correspond to the one or more overlap regions 217; determine respective brightness of the one or more overlap regions 217; and control pixel of the given image modulator and each of the respective image modulators, at least adjacent edge pixels corresponding to edges of the one or more overlap regions 217, to increase brightness in corresponding projector image regions based on the respective brightness.

Figure 17:
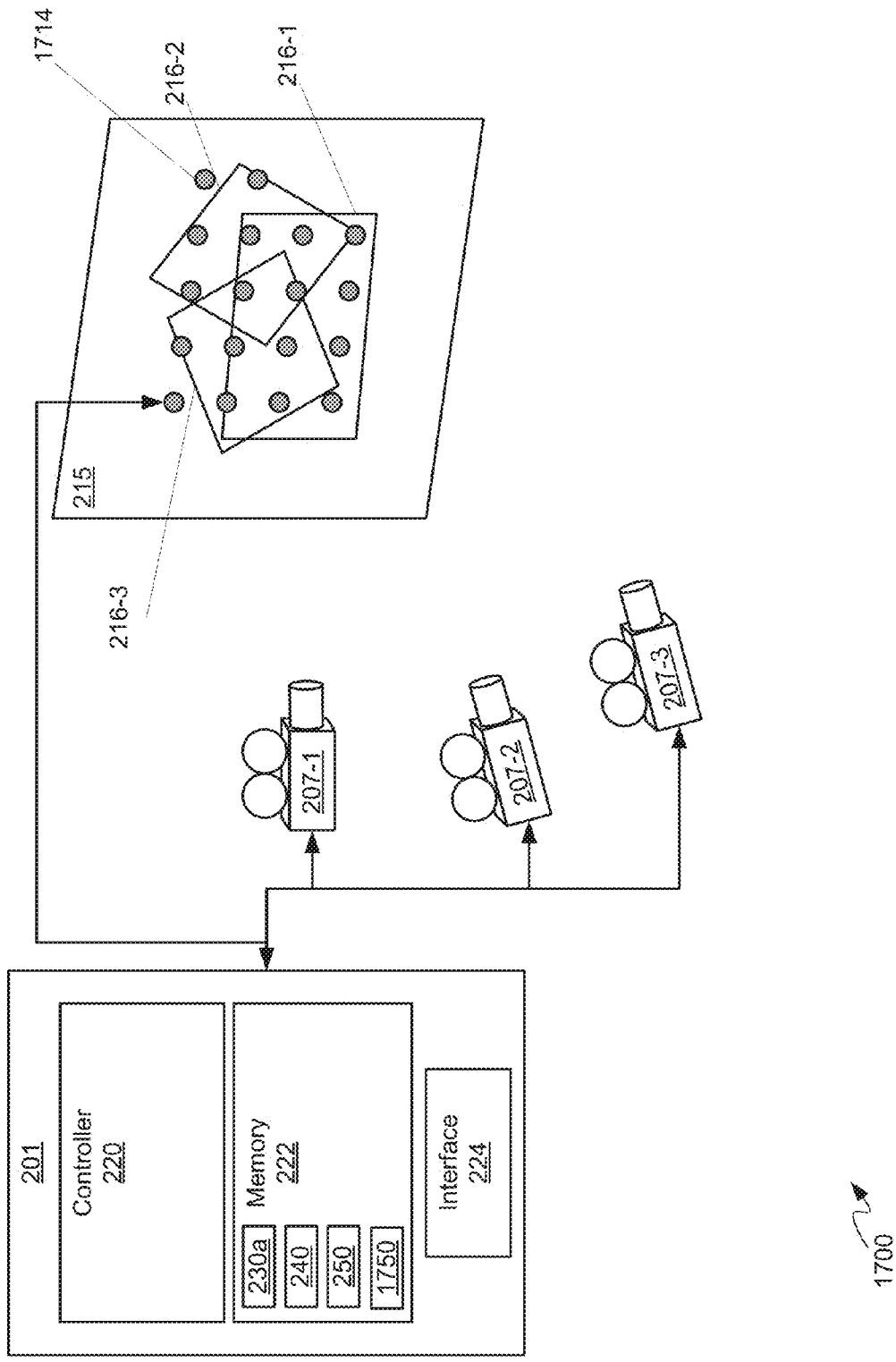
FIG. 17 depicts a system for digital black level blending that includes light sensors, and which can be used in the system of FIG. 1, according to non-limiting implementations.

Furthermore, other types of sensors configured to acquire digital images of at least portions of the plurality of projector images 216. For example, attention is next directed to FIG. 17 which depicts a system 1700 that is substantially similar to system 200, with like elements having like numbers. The system 1700 can be used with the system of FIG. 1, in a manner similar to the system 200, assuming that the system of FIG. 1 includes light sensors as described hereafter.

In contrast to the system 200, the system 1700 does not include a camera and/or camera sensor (and/or a camera and/or a camera sensor is optional). Rather, in the system 1700, a plurality of light sensors 1714 are one or more of embedded in the screen 215 and located adjacent the screen 215. Each of the light sensors 1714 is in communication with the computing device 201 and is configured to sense light and provide an indication to the computing device 201 when light is sensed. Furthermore, the memory 222 includes light sensor position data 1750 which stores positions of each of the light sensors 1714. Hence, when a light sensor 1714 detects light, for example when one or more of the projector images 216 are projected onto the screen 215, the light sensor 214 provides an indication of such to the computing device 201, which correlates light sensors 1714 that detected light with their respective positions. In this manner, the light sensors 1714 acquire digital images of at least portions of the plurality of projector images 216.

For example, each of the light sensors 1714 includes, but is not limited to, one or more of a photodiode, a photoresistor, a phototransistor and the like, and are configured to detect light over an area that is larger than compared to a pixel device of the camera 214, for example over areas of about 1 mm$^2$, or less. However, the size of the light sensors 1714 are not drawn to scale in FIG. 17, and are mere schematically indicated by respective circles. Furthermore, while certain positions of the light sensors 1714 are depicted, the light sensors 1714 can be in other positions. Similarly, while a certain number of light sensors 1714 are depicted, present implementations include more or fewer light sensors 1714. Indeed, in implementations where an approximate position of the projector images 216 at the screen 215 is known, the configuration of the light sensors 1714 can be selected such that: when the screen 215 is planar, each of the projector images 216 is detected by at least three light sensors 1714, or at least four light sensors 2174 to account for measurement error; and when the screen 215 is not planar (e.g. curved and/or three-dimensional), each of the projector images 216 is detected by at least six light sensors 1714. In particular implementations, however, at least light sensors 174 are used per projector image 1714, both for redundancy and to account for measurement error.

Furthermore, in some implementations, the light sensors 1714 are embedded in the screen 215, and/or object onto which the projector images 216 are projected, for example into the surface of the screen. In these implementations, the positions of the light sensors 1714 stored in the light sensor position data 1750 can be supplied with the screen 215, for example from a manufacturer of the screen 215 and the like.

In other implementations, the light sensors 1714 are placed adjacent to the screen 215, and/or object onto which the projector images 216 are projected, for example as an array of interconnected light sensors; indeed, in these implementations, the light sensors 1715 can be temporarily positioned adjacent the surface of the screen 215 by a technician, and the like, once the positions of the projected images 216 on the screen 215 are visually determined by the technician. In these implementations, the positions of the light sensors 1714 stored in the light sensor position data 1750 can be provisioned by the technician using, for example, measurement tools, a calibrated camera, and the like.

In any event, the digital images of the projector images 216 provided by the light sensors 1714 and the light sensor position data 1750 are very low resolution, as compared to the digital images and/or digital pictures generated by the camera 214 and/or a light sensor thereof. For example, the digital images of the projector images 216 provided by the light sensors 1714 may be as few as 3-8 pixels per digital image.

Furthermore, given the positions of the light sensors 1714, structured light images, and the like, can be used to determine correspondences between a light sensor 1714 and points of the image modulators 617. Put another way, 2D light sensor-to-2D projector correspondences are determined which can, in turn, be used to determine projector-to-projector correspondences (e.g. the respective correspondences representing the respective points of the image modulators of projectors 207 that correspond to the one or more overlap regions 217). These correspondences can be applied to the backshooting technique described with reference to FIG. 6A.

Indeed, such correspondences may be determined from points of the image modulator 617-1 that are in an overlap region and that correspond and do not correspond to a projected point located at a light sensor 1714, using interpolation techniques and/or extrapolation techniques to determine mapping and/or correspondences for points in an overlap region that lie between points that correspond to light sensor positions.

Indeed, such interpolation and/or extrapolation can also occur in implementations that include the camera 214 and 2D camera-to-2D projector correspondences. For example, in these implementations, 2D camera-to-2D projector correspondences are determined for only a subset of the points (e.g. pixels) of the camera sensor, such that the backshooting technique is used for only a subset of the points p1$i$, p2$i$, p3$i$ in the overlap region, and interpolation techniques and/or extrapolation techniques can be used to determine mapping and/or correspondences for points in an overlap region that lie between the points used in the backshooting.

Furthermore, the application 230 and the method 400 can be adapted to account for one or more sensors configured to acquire digital images of at least portions of the plurality of projector images 217, such one or more sensors including one or more the camera sensor of the camera 214 and the light sensors 1714. Indeed, in some implementations, a combination of both the camera sensor of the camera 214 and the light sensors 1714 can be used to perform the mapping using the backshooting technique described herein.

Indeed, returning briefly to FIG. 17, the memory 222 stores an application 230*a* that, when processed by controller 220, enables controller 220 and/or computing device 201 to: determine, using at least sensor configured to acquire digital images of at least portions of the plurality of projector images 216, respective correspondences between projected points of a given projector image 216, and respective points of respective image modulators of other projectors 207 of the plurality of projectors 207, the respective correspondences representing the respective pixels of the image modulators of the other projectors 207 that correspond to the one or more overlap regions 217; determine respective brightness of the one or more overlap regions 217; and, control pixels of the given image modulator and each of the respective image modulators, at least adjacent edge pixels corresponding to edges of the one or more overlap regions 217, to increase brightness in corresponding projector image regions based on the respective brightness. In some implementations, the application 230*a* further enables controller 220 and/or computing device 201 to: determine a subset of the respective correspondences using interpolation techniques and/or extrapolation techniques.

Attention is now directed to FIG. 18, which depicts a flowchart of a method 1800 for digital black level blending, according to non-limiting implementations. In order to assist in the explanation of method 1800, it will be assumed that method 1800 is performed using system 200 and/or system 1700, and specifically by controller 220 of device 201, for example when controller 220 processes application 230a. Indeed, method 1800 is one way in which system 200 and/or system 1700 and/or device 201 and/or controller 220 can be configured. Furthermore, the following discussion of method 1800 will lead to a further understanding of device 201, and system 200 and/or system 1700 and their various components. However, it is to be understood that system 200 and/or system 1700 and/or device 201 and/or controller 220 and/or method 1800 can be varied, and need not work exactly as discussed herein in conjunction with each other, and that such variations are within the scope of present implementations.

Regardless, it is to be emphasized, that method 1800 need not be performed in the exact sequence as shown, unless otherwise indicated; and likewise various blocks may be performed in parallel rather than in sequence; hence the elements of method 1800 are referred to herein as "blocks" rather than "steps". It is also to be understood, however, that method 1800 can be implemented on variations of system 200 as well. Furthermore, while computing device 201 is described as implementing and/or performing each block of method 1800, it is appreciated that each block of method 1800 occurs using controller 220 processing application 230a.

It is further appreciated that method 1800 occurs for each given projector 207 of the plurality of projectors 207, and hence method 1800 can be executed in parallel for each projector 207 and/or in a sequence for each projector 207 and/or in parallel for each section/region/scanline/pixel of a projector 207.

It is further assumed in the method 1800 that the plurality of projector images 216 are overlapping in one or more overlap regions 217.

At block 1801, controller 220 determines, using at least one sensor (e.g. at least one sensor configured to acquire digital images of at least portions of the plurality of projector images 216), respective correspondences between projected points of a given projector image 216, projected onto an object (e.g. the screen 215) by the given projector 207 at the object, and respective points of respective image modulators of other projectors 207 of the plurality of projectors 207, the respective correspondences representing the respective points of the image modulators of the other projectors 207 that correspond to the one or more overlap regions 217. The block 1801 is generally similar to the block 401 of the method 400, however the block 1801 is not dependent on the camera 214, and the at least one sensor of the block 1801 comprises one more of: the camera sensor of the camera 214, and the light sensors 1714.

At an optional block 1802 (indicated as optional by virtue if the block 1802 being depicted with broken lines), controller 220 determines a subset of the respective correspondences using one or more of interpolation techniques interpolation techniques and extrapolation techniques, for example using the respective correspondences determined as described with respect to FIG. 6A. Furthermore, in some implementations, the block 1802 can be implemented in conjunction with the block 1801 and/or after the block 1801.

At block 1803, controller 220 determines respective brightness of the one or more overlap regions 217. The block 1803 is generally similar to the block 403 of the method 400.

At block 1805, controller 220 controls pixels of the given image modulator and each of the respective image modulators, at least adjacent edge pixels corresponding to edges of the one or more overlap regions 217, to increase brightness in corresponding projector image regions based on the respective brightness. The block 1805 is generally similar to the block 405 of the method 400.

Furthermore, the method 1800 otherwise proceeds as described elsewhere in the present specification with respect to FIG. 7 to FIG. 16.

In general, the present specification is directed to methods and system in which overlap regions of projected images are found using a mapping between respective pixels of projector image modulators and projected regions on an object, such as a screen, and areas of the projected outside the overlap regions are controlled to minimize visible transitions therebetween.

Those skilled in the art will appreciate that in some implementations, the functionality of devices 101, 105, 108, 201, and content player 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 105, 108, 201, and content player 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a plurality of projectors, each comprising an image modulator, the plurality of projectors located to project respective projector images, formed by respective image modulators, a plurality of projector images overlapping in one or more overlap regions;
at least one sensor configured to acquire digital images of at least portions of the plurality of projector images; and
a computing device configured to, for each given projector comprising a given image modulator, of the plurality of projectors:
determine, using the at least one sensor, respective correspondences between projected points of a given projector image and respective points of respective image modulators of other projectors of the plurality of projectors, the respective correspondences determined only for the respective points of the respective image modulators of the other projectors that correspond to respective projected points that points that are within a given maximum distance of the projected points of the given projector image, the given maximum distance being a maximum distance between adjacent projected grid points of a grid of points previously projected on an object onto which the given projector image is projected;

determine respective brightness of the one or more overlap regions;

determine respective brightness of projector image regions adjacent the one or more overlap regions; and, based on the respective correspondences, control at least a portion of the pixels of the given image modulator and each of the respective image modulators, outside of at least one of the one or more overlap regions, in blend regions of the projector image regions adjacent the one or more overlap regions, to gradually increase brightness in the blend regions from the respective brightness of the corresponding projector image regions to the respective brightness of the one or more overlap regions.

2. The system of claim 1, wherein the respective correspondences include correspondences associated with respective dead zone pixels around a perimeter of each of the given image modulator and the respective image modulators.

3. The system of claim 1, wherein the computing device is further configured to control at least a portion of the pixels of the given image modulator and each of the respective image modulators, outside of at least one of the one or more overlap regions, in the blend regions of the projector image regions adjacent the one or more overlap regions, to gradually increase the brightness in the blend regions from the respective brightness of the corresponding image regions to the respective brightness of the one or more overlap regions according to one or more of: respective distances of pixels in the blend regions to the one or more overlap regions; a linear function; an S-function; and content of the plurality of images.

4. The system of claim 1, wherein the computing device is further configured to control the pixels of the given image modulator and each of the respective image modulators, at least adjacent edge pixels corresponding to the edges of the one or more overlap regions, according to one or more of: a closest corresponding overlap region edge of projected projector images; a weighting based on one or more closest corresponding overlap region edges of the projected projector images; and a cumulative brightness from each of the one or more closest corresponding overlap region edges of the projected projector images.

5. The system of claim 1, wherein the computing device is further configured to: determine respective orientations of image pixels of the given projector image and other projector images that form the one or more overlap regions; and further control the pixels of the given image modulator and each of the respective image modulators according to the respective orientations of the image pixels.

6. The system of claim 1, wherein the computing device is further configured to: determine respective projected sizes of image pixels of the given projector image and other projector images that form the one or more overlap regions; and further control the brightness of the pixels of the given image modulator and each of the respective image modulators according to the respective projected sizes of the image pixels.

7. The system of claim 1, wherein the computing device is further configured to: determine respective projected colors of image pixels of the given projector image and other projector images that form the one or more overlap regions; and further control the pixels of the given image modulator and each of the respective image modulators according to the respective projected colors of the image pixels.

8. A method comprising:

at a system including a: computing device; a plurality of projectors, each comprising an image modulator, the plurality of projectors located to project respective projector images, formed by respective image modulators, a plurality of projector images overlapping in one or more overlap regions; and at least one sensor configured to acquire digital images of at least portions of the plurality of projector images, for each given projector comprising a given image modulator, of the plurality of projectors:

determining, using the at least one sensor, respective correspondences between projected points of a given projector image and respective points of respective image modulators of other projectors of the plurality of projectors, the respective correspondences determined only for the respective points of the respective image modulators of the other projectors that correspond to respective projected points that points that are within a given maximum distance of the projected points of the given projector image, the given maximum distance being a maximum distance between adjacent projected grid points of a grid of points previously projected on an object onto which the given projector image is projected;

determining respective brightness of the one or more overlap regions;

determining respective brightness of projector image regions adjacent the one or more overlap regions; and, based on the respective correspondences, control at least a portion of the pixels of the given image modulator and each of the respective image modulators, outside of at least one of the one or more overlap regions, in blend regions of the projector image regions adjacent the one or more overlap regions, to gradually increase brightness in the blend regions from the respective brightness of the corresponding projector image regions to the respective brightness of the one or more overlap regions.

9. The method of claim 8, wherein the respective correspondences include correspondences associated with respective dead zone pixels around a perimeter of each of the given image modulator and the respective image modulators.

10. The method of claim 8, further comprising controlling at least a portion of the pixels of the given image modulator and each of the respective image modulators, outside of at least one of the one or more overlap regions, in the blend regions of the projector image regions adjacent the one or more overlap regions, to gradually increase the brightness in the blend regions from the respective brightness of the corresponding image regions to the respective brightness of the one or more overlap regions according to one or more of: respective distances of pixels in the blend regions to the one or more overlap regions; a linear function; an S-function; and content of the plurality of images.

11. The method of claim 8, further comprising controlling the pixels of the given image modulator and each of the respective image modulators, at least adjacent edge pixels corresponding to edges of the one or more overlap regions, according to one or more of: a closest corresponding overlap region edge of projected projector images; a weighting based on one or more closest corresponding overlap region edges of the projected projector images; and a cumulative brightness from each of the one or more closest corresponding overlap region edges of the projected projector images.

12. The method of claim 8, further comprising determining respective orientations of image pixels of the given projector image and other projector images that form the one or more overlap regions; and further control the pixels of the given image modulator and each of the respective image modulators according to the respective orientations of the image pixels.

13. The method of claim 8, further comprising determining respective projected sizes of image pixels of the given projector image and other projector images that form the one or more overlap regions; and further control the brightness of the pixels of the given image modulator and each of the respective image modulators according to the respective projected sizes of the image pixels.

14. The method of claim 8, further comprising determining respective projected colors of image pixels of the given projector image and other projector images that form the one or more overlap regions; and further control the pixels of the given image modulator and each of the respective image modulators according to the respective projected colors of the image pixels.

15. A non-transitory computer-readable medium storing a computer program, wherein execution of the computer program is for:

at a computing device in communication with a plurality of projectors, each comprising an image modulator, the plurality of projectors located to project respective projector images, formed by respective image modulators, a plurality of projector images overlapping in one or more overlap regions; and at least one sensor configured to acquire digital images of at least portions of the plurality of projector images, for each given projector comprising a given image modulator, of the plurality of projectors:

determining, using the at least one sensor, respective correspondences between projected points of a given projector image and respective points of respective image modulators of other projectors of the plurality of projectors, the respective correspondences determined only for the respective points of the respective image modulators of the other projectors that correspond to respective projected points that points that are within a given maximum distance of the projected points of the given projector image, the given maximum distance being a maximum distance between adjacent projected grid points of a grid of points previously projected on an object onto which the given projector image is projected;

determining respective brightness of the one or more overlap regions;

determining respective brightness of projector image regions adjacent the one or more overlap regions; and, based on the respective correspondences, control at least a portion of the pixels of the given image modulator and each of the respective image modulators, outside of at least one of the one or more overlap regions, in blend regions of the projector image regions adjacent the one or more overlap regions, to gradually increase brightness in the blend regions from the respective brightness of the corresponding projector image regions to the respective brightness of the one or more overlap regions.

* * * * *